United States Patent
Richards et al.

(10) Patent No.: US 11,488,084 B2
(45) Date of Patent: Nov. 1, 2022

(54) COMPUTER SYSTEMS AND METHODS TO PROTECT USER CREDENTIAL AGAINST PHISHING

(71) Applicant: Lookout, Inc., San Francisco, CA (US)

(72) Inventors: Jeremy Boyd Richards, Oakville (CA); Brian James Buck, Livermore, CA (US)

(73) Assignee: Lookout, Inc., San Francisco, CA (US)

( * ) Notice: Subject to any disclaimer, the term of this patent is extended or adjusted under 35 U.S.C. 154(b) by 65 days.

(21) Appl. No.: 16/872,227

(22) Filed: May 11, 2020

(65) Prior Publication Data
US 2020/0286015 A1    Sep. 10, 2020

Related U.S. Application Data

(63) Continuation of application No. 16/556,923, filed on Aug. 30, 2019, now Pat. No. 10,699,234, which is a continuation of application No. 16/295,990, filed on Mar. 7, 2019, now Pat. No. 10,453,017.

(51) Int. Cl.
| | |
|---|---|
| *G06Q 10/06* | (2012.01) |
| *H04L 9/40* | (2022.01) |
| *G06F 16/28* | (2019.01) |
| *H04L 61/4511* | (2022.01) |

(52) U.S. Cl.
CPC ....... *G06Q 10/0635* (2013.01); *G06F 16/285* (2019.01); *H04L 61/4511* (2022.05); *H04L 63/1483* (2013.01)

(58) Field of Classification Search
CPC .............. G06Q 10/0635; G06F 16/285; H04L 61/1511; H04L 63/1483
See application file for complete search history.

(56) References Cited

U.S. PATENT DOCUMENTS

| | | |
|---|---|---|
| 8,286,239 B1 | 10/2012 | Sutton |
| 8,776,168 B1 | 7/2014 | Gibson et al. |
| 9,032,066 B1 | 5/2015 | Erdmann |
| 9,384,026 B1 | 7/2016 | Banga et al. |
| 9,967,236 B1 | 5/2018 | Ashley et al. |
| 10,051,001 B1 | 8/2018 | Ashley et al. |

(Continued)

OTHER PUBLICATIONS

Assistivetechnology, Wikipedia, printed on Jan. 17, 2019.

(Continued)

*Primary Examiner* — Ayoub Alata
(74) *Attorney, Agent, or Firm* — Greenberg Traurig

(57) ABSTRACT

Computer systems and methods to protect user credential against phishing with security measures applied based on determination of phishing risks of locations being visited, phishing susceptibility of users, roles of users, verification of senders of messages, and/or the timing of stages in accessing and interacting with the locations. For example, when a site is unclassified at the onset of being accessed by a user device, security measures can be selectively applied to allow the site to be initially viewed on the user device, but disallow some user interactions to reduce phishing risk. For example, a response to a domain name system (DNS) request can be customized based on a user risk level. For example, a message can be displayed without a profile picture of a contact of a user when the sender of the message appears to be the contact but cannot be verified to be the contact.

21 Claims, 9 Drawing Sheets

(56) References Cited

U.S. PATENT DOCUMENTS

| | | |
|---|---|---|
| 10,453,017 B1 | 10/2019 | Richards et al. |
| 10,699,234 B1 | 6/2020 | Richards et al. |
| 2006/0200531 A1* | 9/2006 | Tokuda .................. H04L 51/24 |
| | | 709/206 |
| 2012/0303808 A1 | 11/2012 | Xie |
| 2012/0324094 A1 | 12/2012 | Wyatt et al. |
| 2014/0201844 A1 | 7/2014 | Buck |
| 2017/0180413 A1 | 6/2017 | Petry et al. |
| 2017/0251010 A1 | 8/2017 | Irimie et al. |
| 2018/0152471 A1* | 5/2018 | Jakobsson .............. G06Q 50/01 |
| 2018/0288070 A1 | 10/2018 | Price et al. |
| 2019/0034623 A1 | 1/2019 | Lowry et al. |

OTHER PUBLICATIONS

Blackhole (Networking), Wikipedia, printed on Jan. 24, 2019.
C. Contavalli, W. van der Gaast, D. Lawrence, W. Kumari, "Client Subnet in DNS Queries", Internet Engineering Task Force (IETF), Request for Comments: 7871, May 2016.
Computer Accessibility, Wikipedia, printed on Jan. 17, 2019.
EDNS, Wikipedia, printed on Jan. 17, 2019.
Email Spoofing, Wikipedia, printed on Jan. 22, 2019.
J. Damas, M. Graff, P. Vixie, "Extension Mechanisms for DNS (EDNS(0))", Internet Engineering Task Force (IETF), Request for Comments: 6891, Apr. 2013.
Phishing, Wikipedia, printed on Jan. 22, 2019.
Proxy Server, Wikipedia, printed on Feb. 4, 2019.
Sender Policy Framework, Wikipedia, printed on Jan. 22, 2019.
Sideloading, Wikipedia, printed on Feb. 4, 2019.

* cited by examiner

COMPUTER SYSTEMS AND METHODS TO PROTECT USER CREDENTIAL AGAINST PHISHING

RELATED APPLICATIONS

The present application is a continuation application of U.S. patent application Ser. No. 16/556,923, filed Aug. 30, 2019, which is a continuation application of U.S. patent application Ser. No. 16/295,990, filed Mar. 7, 2019, issued as U.S. Pat. No. 10,453,017 on Oct. 22, 2019, both entitled "Computer Systems and Methods to Protect User Credential Against Phishing," the entire disclosures of which applications are hereby incorporated herein by reference.

FIELD OF THE TECHNOLOGY

At least some embodiments disclosed herein relate to computer security in general and, more particularly but not limited to, techniques to reduce risks related to phishing.

BACKGROUND

Phishing is a type of fraudulent attempt used to obtain sensitive information, such as user credentials for online access, personal information, financial information, etc. For example, an electronic message containing a link to a fake website may be sent to a victim, causing the victim to follow the link to visit the fake website that appears to be a legitimate website due to its apparent similarity with the legitimate website. When the user mistakenly signs in using the user credential at the fake website using the credential for the legitimate website and/or provides the sensitive information under the false impression that the user is interacting with the legitimate website, the fake website harvests the user credential for the legitimate website (e.g., username and password) and/or other sensitive information (e.g., credit card numbers, personal information).

Phishing can be carried out through email spoofing where a phishing email contains a forged sender address, causing the recipient to mistakenly trust the email and click on the links provided in the email to visit a phishing site. For example, the header of an email message can include a "from" field identifying a name and/or the email address from which the email message is sent. A typically email message is delivered without verification that the information provided in the "from" field is correct. Similarly, the header of an email message can include a "reply-to" field identifying a name and/or the email address to which a reply to the email message is to be sent. An email message is typically delivered without verification that the information provided in the "reply-to" field is correct. Thus, a phishing email may be configured to appear from a sender that the recipient would trust.

Sender policy framework (SPF) is an email authentication system designed to detect some forged sender addresses. For example, computers that are authorized to send email from a domain can be specified in domain name system (DNS) records. Thus, receivers may verify the SPF information before receiving the emails from unauthorized sources.

Some techniques have been developed to prevent phishing attacks.

For example, a list of known phishing sites can be stored and checked against websites to be visited by a user. A warning message can be displayed when a browser is attempting to visit a known phishing site.

For example, a DNS server can be configured to filter out known phishing domains.

For example, a spam filter can be implemented in an email system to reduce phishing emails.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
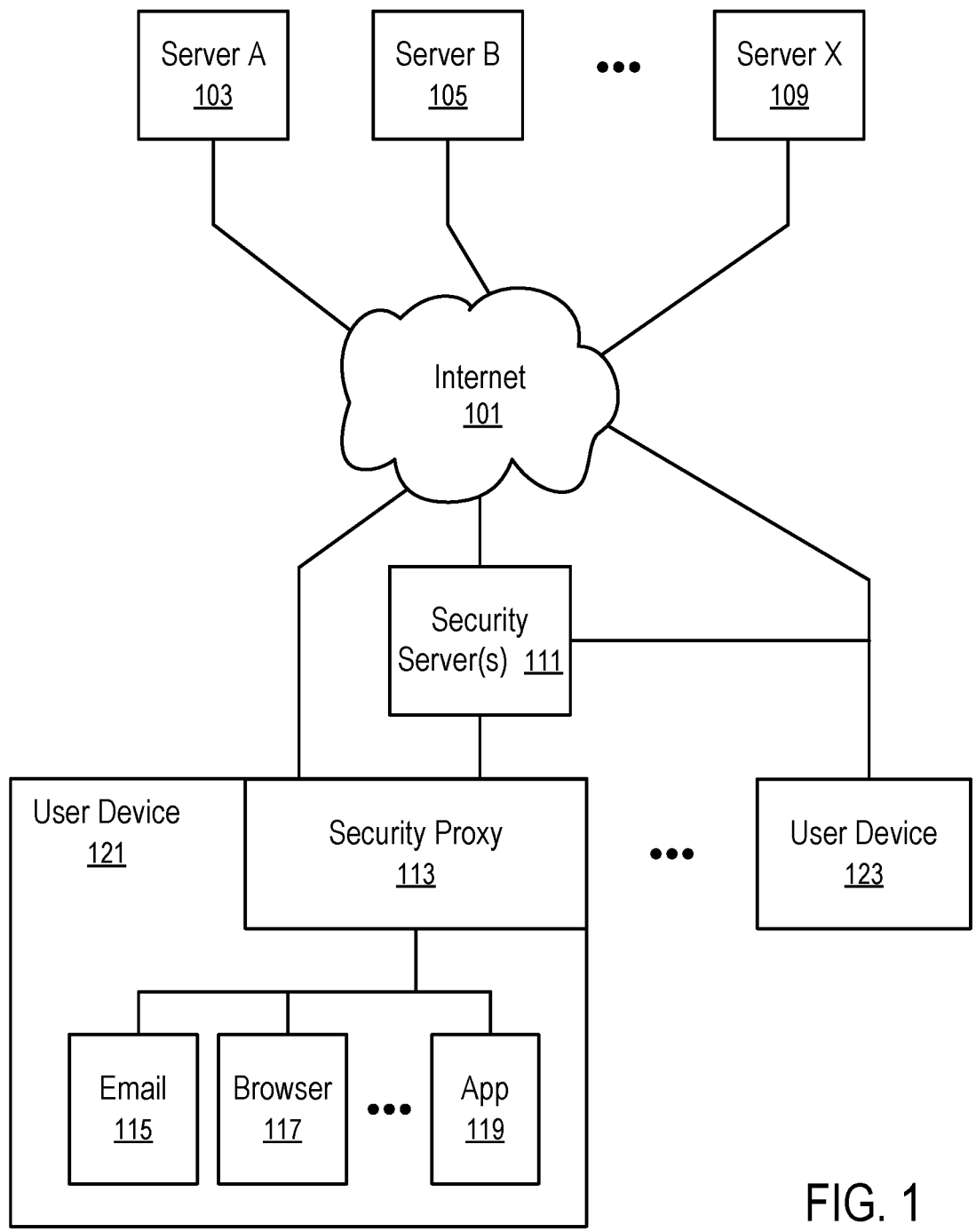
FIG. 1 shows a system in which techniques to protect a user credential against phishing can be implemented.

At least some techniques disclosed herein relate to the processing of a site, content, file, or message for which a security system is temporarily unable to decide, classify, recognize, identify and/or determine as to whether or not it is a part of a phishing attempt.

For example, a risk score can be evaluated based on the degree of phishing susceptibility of the user and the role of the user in an enterprise/company/organization. Based on the risk score, one or more security measures can be applied to the presentation of the site, content, file, and/or message. Such security measures can include blocking the site, content, file, and/or message from being presented on a computing device of the user, allowing a presentation of the site, content, file, and/or message while blocking user interactions with the presented content, allowing some interactions (e.g., browsing, following links, navigating from one location to another) while blocking text input made via the presentation, allowing some interactions but blocking transmission of text input and/or other inputs made via presentation, selectively redirecting the user visit to an alternative site through a customized DNS response, or, selectively presenting profile pictures (e.g., images, icons, or photos) of known contacts based on a result of sender identity verification, etc., or any combinations of such measures.

The degree of phishing susceptibility of the user can be evaluated via a phishing education course and a test. For example, the degree of phishing susceptibility of the user can be evaluated via a controlled phishing campaign that tests the users in a network of computing devices. The security system of the network can be programmed to whitelist the controlled phishing campaign by identifying the sites used for the campaign, the time and duration of the campaign, the targeted users of the campaign, such that when the users are interacting with the sites of the controlled phishing campaign, the security system does not identify the sites as phishing.

Optionally, the security system can be configured to track information related to phishing while protecting the privacy of the users experiencing the phishing activities. For example, when a request is transmitted from a user device to a security server for phishing analysis, the privacy of the user of the device can be protected via anonymization of the request. For example, the security server can be configured to perform the analysis without logging the identity of the user device. For example, the phishing analysis result can be stored in the user device but not in a server; and the network of computing devices can be configured to allow administrator to query for an aggregated result of a phishing activity, site or message (e.g., a count of devices that have experience with it), without information that attributes to an individual user or computing device (e.g., without revealing which computing device has experienced the phishing activity, site or message). In some instances, an administrator may request permission to access information related to a phishing activity, site or message; and the user of a device may review the request and selectively grant or deny the request.

At least some embodiments disclosed herein include a selected response to a visit to an unassessed or unconfirmed domain regarding phishing, where the response is based on the user risk. Users of different degrees of susceptibility to phishing can be provided with different security responses when the users visit the same unassessed or unconfirmed domain or URL (Uniform Resource Locator) (unassessed or unconfirmed regarding phishing).

When a user is accessing a domain via a URL that has not been previously assessed for phishing activities, the computer security system may not be able to generate a YES or No answer regarding whether the domain/URL is phishing (or potentially harmful). In some situations, the full URL is not available for assessment, rather only the domain name is available; in such situations, the assessment is made based on the domain name alone. The term "domain/URL" herein refers to a URL, or a domain name when a full URL is not available. When the answer cannot be generated within an allowable time window that is configured to avoid noticeable and/or excessive delay in processing the access, there can be some indicators of risk but not high enough to unequivocally designate the domain/URL as phishing or harmful.

In some instances, different users and devices in a network of computing devices can be treated in the same way in view of the unassessed, unconfirmed, or unclassified domain/URL. For example, the network connection to an unassessed, unconfirmed, or unclassified domain/URL can be blocked for all users/devices in one configuration, and allowed in another configuration.

Preferably, security responses can be more cautious when the users involved have higher risk and less restrictive when the users involved have lower risk. Different users can have different histories of susceptibility to phishing (e.g., as measured based on internal phishing campaign results) and/or may have different potential risk factors due to the roles of the users in the organization/company/organization/ network.

For example, a risk score can be computed based on a determination of user risk and/or a determination of risk associated with the user role in the enterprise. A security response to accessing an unassessed, unconfirmed, unclassified domain regarding phishing can be tailor based on the risk score level. For example, access can be denied for users with a high risk score level as a conservative security response, granted for users with a low risk score level as a relaxed security response, and partially blocked for other users as a response with precaution.

For example, user risk can be evaluated via test scores on phishing susceptibility test performed based on internal phishing education and/or results of internal phishing campaigns. For example, some users having roles associated with higher risks (e.g., for working in finance or payroll, or having a privileged administrator role).

In some instances, depending on a risk score of a user, the user can be allowed initially to view the content of an unassessed, unconfirmed, or unclassified domain, a site at a URL, a message or a file. However, user interaction with a presentation of the content of the domain, the site at the URL, the message or the file can be suppressed until the security system completes the assessment in the background.

When a user is visiting an unassessed domain/URL, the greatest risk is from the user credentials being phished, which typically happens after the user has viewed a response to a visit to a domain/URL and when the user enters information or credentials into the responding page and submits the information or credentials.

To prevent the user credentials from being phished, the security system can be configured to allow the network connection to the unassessed or unclassified domain/URL initially, allow the user to view the response from the domain/URL, but suppress any sending of information from the user/device to the unassessed domain/URL or according to the content downloaded from the unassessed domain/URL, as long as it remains unassessed and/or unclassified.

The security system can use the time period during which the user reviews the response from the domain/URL to perform further computation/analysis in classifying the domain/URL. Thus, the initial time period the user has to wait before viewing the response from the domain/URL can be reduced. If a result of the assessment becomes available during the process, the security measurement for the domain/URL can be adjusted. For example, if the domain/URL is assessed by the security system as being safe, the suppression of user interaction can be removed, which allows user interaction with the domain/URL to proceed. If the domain/URL is assessed by the security system as phishing or potentially harmful, the security measure can be adjusted to block any further network connection to the domain/URL.

In some embodiments, a security measure is implemented based at least in part on a DNS server. The DNS server can be configured to provide an address resolution based on risk scores of users visiting suspicious sites/domains. Thus, different devices/users can be treated differently.

In some instances, a risk score is not only a function of the role of the user in an enterprise/company/organization and/or a degree of phishing susceptibility of the user, but also a level of suspiciousness of the domain/URL in phishing.

For example, the DNS server can be configured to allow a low risk user/device to visit an unknown but possibly suspicious site (e.g., possibly a phishing site), but disallow a high risk user/device to visit even mildly suspicious sites. Such a configuration can be performed by an administrator as a policy for all or individual users of an enterprise.

For example, a security module can be configured in a computing device to provide user and/or device risk state to a DNS resolver/server. For example, the risk score of the user/device can be transmitted via Extension Mechanisms for DNS (e.g., EDNS0) during DNS queries. A DNS server/resolver receiving such a DNS query that contains the risk score can use the score in determining a response to the DNS query/resolution request.

For example, when the DNS query/resolution request identifies a high-level risk score, the DNS server/resolver can be configured to return an empty result or a result pointing to an informational server which is configured to inform the client device that it is out of risk compliance, optionally provide instructions on how to remediate, and/or optionally provide a link to software to be downloaded to remediate, etc.

For example, when the DNS query/resolution request identifies a medium-level risk score, the DNS server/resolver can be configured to return a result pointing to a server which is configured to conduct additional authentication or verification of user or device.

For example, when the DNS query/resolution request identifies a low-level risk sore, the DNS server/resolver can be configured to return pointing to the service provider of the suspicious site.

To protect the privacy of the user device, the contents of the EDNSO extension configured to provide the indication of device-risk-state can be optionally encrypted (e.g., using a secret key shared between the security module and the DNS server/resolver, or a public key of the DNS server/resolver). For enhanced security, the indication of device-risk-state can be protected via a digital signature of the security module (e.g., signed using the private key of the security module or another security server that generates the risk assessment).

In general, the EDNSO extension can be implemented in the operating system of the computing device of the user. For example, the operating system can implement a device risk state assessment (e.g., based on past web visitation history of the user). In some instances, a security application or module is implemented in the computing device of the user to obtain the risk score from the operating system, or a remote security server, using an application programming interface (API) after registration with the operating system or the security server. In some instances, a network proxy is configured to dynamically modify an outbound DNS request to add the EDNSO extension containing the risk information about user/device. In an embodiment, the use of the EDNSO extension can be performed by a browser component, or a browser extension, or by an application for its own DNS requests, or by an SDK included into an application.

Optionally, a list of domains is maintained; and the security system is configured to add the EDNSO extension for domains on the list but not for other domains. Optionally, a security server provides the list periodically to the operating system, module, application, or proxy server that is configured to add the EDNSO extension.

Optionally, one or more categories of domains (e.g., financial services providers, health services providers, etc.) is maintained; and the security system is configured to add the EDNSO extension for domains in the category but not for other domains.

In some embodiments, a client/user computing device is configured to protect against credential phishing using a technique, where a security application or module running on, or a service provided to, the computing device is configured to absorb the user inputs to a presentation of the content of a suspicious site, a message, or a file, until it can be determined that the site, message or file is not a threat.

Phishing attacks are often configured to obtain the credentials of a user for a particular website or service. Cloned websites are typically used in such phishing attempts. A cloned website is typically a copy of an authentic website intended to appear to a user as the authentic website, but modified to perform some malicious behavior. A client-side safe browsing service can be implemented via a DNS resolver and/or a local network transparent client-side proxy. The service can be configured to lookup a domain or a URL (e.g., when available) from a security server that can be remote from client/user computing device and/or external to the safe browsing service. The service can determine whether the domain/URL is SAFE, or UNSAFE, or UNCLASSIFIED with respect to phishing threat.

When a domain/URL is not pre-classified (e.g., UNCLASSIFIED or previously unknown to the security system), it can take an amount of time to perform a classification. The amount of time can be appreciable and noticeable to the user, if the browser has to wait for the result of the classification before loading the content from the domain/URL. In such a situation, it can be unsatisfactory to allow the browser to proceed as if the site were safe, or require the user to experience the noticeable delay caused by performing the classification.

Preferably, the safe browsing service is configured to allow the fetching and presentation of the content of the UNCLASSIFIED site while the security system is concurrently performing the classification. Further, the safe browsing service is further configured to prevent submission of credentials to or via the UNCLASSIFIED site that can be a potential phishing threat.

A credential phishing attempt typically does not rely upon vulnerabilities in the viewing devices. Rather it uses a social engineering attempt to convince a user to enter credentials in what appears to be an authentic login page. Thus, there is no harm done in merely displaying the page to a user (assuming that there is no dropper or vulnerability exploitation on the user device). No harm is done until the user enters credentials and submits them to the phishing site.

To prevent the transmission of user credentials to a potential phishing site, network connections/communications between the client/user computing device and the potential phishing domain can be blocked (e.g., through blackholing implemented using a transparent proxy on the client/user computing device) for a duration after the fetching of the content from the site and before a result of the classification of the site becomes available. For example, the transparent proxy can silently discard network traffic that are directed to the phishing site/domain after the initial fetching of the content from the UNCLASSIFIED site and before a result of the classification of the site becomes available. In an embodiment, the transparent proxy can detect a user attempting to enter information into the webpage and begin the blackholing operation at that time. In a different embodiment, the transparent proxy can immediately begin the blackholing operation once the original webpage and its components (e.g., scripts, images, CSS, etc.) have been retrieved, or after the expiration of a short time period from the time of the original webpage fetch.

Alternatively, or in combination, any user attempt to enter credentials on the page can be disallowed, e.g., using Assistive Technology APIs to prevent entry, or by the overlay of a transparent interface that intercepts and takes in the keystrokes.

Alternatively, or in combination, the user is allowed to type in credentials, but the transparent proxy is configured to avoid transmission of the credentials, and/or any data to the phishing website (e.g., blackholing communications as long as the domain/URL remains UNCLASSIFIED).

In general, user attempts to interact with the page of the UNCLASSIFIED site can be prevented via any of several possible mechanisms, such as the use of Assistive Technology APIs, a transparent overlay on the page to intercept gestures, clicks, typing, and/or other inputs, an extension or as a component of a browser configured to selectively preventing interaction or typing into a page presented in the browser, replacing the actual content of the site with an image of the content/webpage that is rendered on a server (or in the background browser). When the webpage is replaced with an image of the webpage for display to the user in a browser, the interactive portion of the webpage (e.g., text input fields) is removed, which prevents user interaction with the site that may be a phishing risk.

Optionally, some user interactions with the webpage of the UNCLASSIFIED can be allowed. For example, the user can be allowed to navigate on the page to visit a particular location within the page or a predetermined location within the UNCLASSIFIED site can be allowed. Such predetermined locations are pre-specified using an URL provided in the webpage without user inputs. Thus, visiting such locations do not provide user credentials; and such an interaction with the webpage may result in the fetch of another webpage from the UNCLASSIFIED site/domain, or another site/domain. However, user interactions involving typing can be blocked to prevent the transmission of user credentials via the webpage of the UNCLASSIFIED site/domain, or another site/domain.

When an external classification service responds with a change in classification from UNCLASSIFIED to SAFE or UNSAFE, the security measure applied to the UNCLASSIFIED site/domain can be adjusted. For example, when the classification result is SAFE, the safe browsing service can notify the user that the page is now classified as SAFE and remove restrictions on user interactions with the page.

For example, when the classification result is UNSAFE, the safe browsing service can notify the user that the page is now classified as UNSAFE and block further user interactions with the page.

For example, the safe browsing service can be configured to notify an administrator or an administrative server of the fact that a browsing attempt on an UNCLASSIFIED page has been changed to SAFE or UNSAFE. The notification may or may not include the identification of the domain/URL being accessed; and the notification may or may not include an identifier of the device or the user or both.

In some instances, after a user has viewed the UNCLASSIFIED webpage, the safe browsing service can be configured to ask the user whether the user can tell if this is a SAFE or UNSAFE webpage. If the user indicates that it is a SAFE webpage (and the risk score of the user below a threshold), the safe browsing service can remove the interaction restrictions and allow the user to proceed in interaction with the webpage.

In some embodiments, a message is configured to be displayed with an image, icon, picture or photo that indicates the identity of the sender of the message. The display of such messages is configured to prevent spurious identity confirmations from being displayed as the profile image, icon, picture or photo of the senders of the message.

For example, an attacker may send a spoofed message that is forged to be from a contact in the contact list of the user. Each of the contacts in the contact list of the user can have a profile image, icon, picture or photo of the contact. Showing the contact picture with the message assists the user in identifying the sender of the message. However, the contact picture from the contact list of the user may provide the false impression that the message is authentic from the contact.

For example, a spoofed email has been seen to be forged to be "from" someone in the contacts list of a victim. An email client showed a picture associated with the contact in presenting/listing the email, making the spoofed email to appear like an authentic message from the contact.

To prevent the false impression of authenticity that a message is from a contact, presentations of a message can be configured to show no contact picture of a matching contact unless the identity of the sender is verified to be the contact.

For example, after determining that a sender identified in a message matches with a contact in the contact list of the user, the security system can be configured to verify whether the contact has indeed send the message. If the verification is successful, the contact picture from the contact list of the user is used to identify the sender in a presentation of the message; otherwise, the message is presented with no contact picture, or presented with a warning picture.

For example, the security system can be configured to communicate with a known server to verify that the sender or the contact has indeed send the message to be displayed.

For example, the message can include a cryptographic hash value of the message such that the known server can check whether or not a sender matching the identity of the contact has send a message with the cryptographic hash value.

For example, the message can have a digital signature applied on the message using a private key of the contact; and the public key of the contact can be used to verify whether or not the message is from the contact.

For example, the message can include an identifier that indicates that the message is from the sender as identified in the message without changes.

For example, the email header can be examined to determine whether a message originates from a server that is responsible for the domain of the address of the sender identified in the email header and whether the server is known for verifying an identify of a sender in initially transmitting the email.

For example, the email header can be checked against spoofing via Sender policy framework (SPF).

Optionally, when the identity of the sender cannot be verified, the message can be blocked, quarantined, or displayed with a warning message.

In some embodiments, when an enterprise phishing test campaign is performed, the security system is configured to suppress phishing detection for the activities of the test campaign. Thus, the test results can be used to evaluate the degrees of the phishing susceptibility of the user.

Effective phishing detectors for computing devices can reduce the effectiveness of a phishing test campaign designed to evaluate the phishing susceptibilities of the users of the computing devices.

To test the phishing susceptibilities of the users of the computing devices, the security system can be configured to whitelist the phishing test campaign. The domains and/or IP addresses of the servers used to conduct the phishing test campaign. The phishing test campaign can be registered via identification of the time duration of the phishing test campaign and/or the targeted users or user devices. Thus, the classification service can be configured to classify as SAFE the sites/URL, content, files and/or messages matching the registered/whitelisted parameters of the phishing test campaign. Alternatively, in combination, an indicator in a field can be set to identify to the security system the phishing attempts of the phishing test campaign. The indicator can be encrypted or signed by the enterprise's certificate private key, with associated info (e.g., timestamp, one time code, a test sequence number) to prevent replay attacks. Thus, the phishing attempts of the phishing test campaign can pass through the security system to test the susceptibilities of the users.

For example, when conducting a mobile phishing simulation campaign, a whitelist can be set up to identify the specifics of the campaign, such as the target domain or URL being used in the campaign, the identifications of the users and/or devices that are being subjected to the campaign, and the start time and the end time of the campaign. During the time window specified in the whitelist, the phishing attempts from the target domain or URL and directed to the targeted users and/or devices can be temporarily classified as SAFE in phishing detection. The whitelisting allows the targeted mobile devices to connect to the phishing simulation.

In some instances, if the user clicks through a link that is determined to be part of the phishing simulation campaign, the security system and/or the phishing simulation campaign can be configured to notify the user that they were phished.

Optionally, if the user clicks through a link that is determined to be part of the phishing simulation campaign, the security system and/or the phishing simulation campaign can be configured to ask the user to classify the site (e.g., in a way similar to asking the user to classify an UNCLASSIFIED site). The response of the user can be used as a test result in the phishing simulation campaign. Optionally, an administrator of the enterprise's computer system can be notified of the test results.

To protect user privacy, certain operating systems may not provide security applications with access to inspect content in a way sufficient to implement phishing protections. Some vendors of operating systems are hesitant to provide APIs that enable an application, even a security application, to breach the privacy of the device user by performing inspection of any or all content viewed by that user whether in a browser, a messaging application, or another application. For example, an existing iOS Content Blocker Extension requires the pre-provisioning of a static rule set; and the extension is blocked from communicating with anything else on-device or off-device. Such an arrangement not useful for implementing a safe browsing service and/or phishing content protection, because no static rule set can be large enough to deal with all possible unsafe browsing conditions.

Sometimes, to protect a user it is necessary to employ the high capacity storage and or computational power of a cloud-based server, rather than relying upon just the storage and processing power of a client/user computer device (e.g., a mobile smartphone or tablet, or a device of the internet of things). Conventional communications with a server could breach user privacy. It would be desirable to allow off-device communication to a server yet still preserve the privacy of the user of the device.

Some embodiments disclosed herein include techniques for the implementation of content inspection in phishing detection that preserves user privacy. For example, a special entitlement or permission can be provided to a security application to allow it to inspect the content in a privacy preserving manner. Privacy preserving architecture can be deployed for off-device Communication.

For example, an enterprise can specify a policy requiring protection for a set of devices. A server-side API can be implemented by an operating system (OS) vendor to use a set of temporarily identifiers for a set of devices to be protected (e.g., an API similar to the legacy mobile device management (MDM) but without requiring the heavy footprint MDM). The operating system (OS) vendor can generate a temporary unique identifier for each device, wherein the use of the identifier is limited to a short period of time. The temporarily unique identifiers anonymize the user devices.

A client code running in a protected way or place (e.g., in a Trusted Execution Environment (TEE)) can be provided with access to a piece of content for phishing detection. The client code can make a phishing protection decision on its own (e.g., to block or warn). If the client code needs to enlist the help of a server, it can do so via the client API which communicates the content and the unique temporarily identifier directly to a pre-configured cloud server, or to an intermediary server which further anonymizes the identity of the user/device by hiding from the cloud server the IP address of the user device. The cloud server is configured to perform its analysis of the content and return a classification or a suggested action (e.g., warn, block, or permit), which is transmitted in the reverse direction to the client/user device for the implementation of the security action for phishing prevention.

In such an arrangement, the cloud server knows only that the content came from a device which it has been empowered to protect but not from which device. Optionally, the cloud server does not retain the content. The operating system (OS) vendor knows only that the token or temporary unique identifier was valid and that an action has been taken. Optionally, the content submitted for inspection by the cloud server is encrypted (e.g., using the public key of the cloud server or a secret key shared between the cloud server and the client code) so that the intermediate server cannot decrypt it to recover the content.

Such a content inspection technique can be implemented for the inspection of content from a web browser, an email client, or another application. It allows a cloud server to participate in the provision of a broader set of protections without compromising user privacy, because the content and its associated meta data can be provided to the cloud server for analysis by a powerful cloud server, while no entity is able to make any association of content or content source with a particular user or device.

Optionally, the security system can be configured to identify phishing URL to an administrator in a privacy preserving way. For example, when the security system detects a user/device visiting an unsafe site/domain/URL, it may compromise the user privacy by reporting to an enterprise, an administrator and/or a security entity that the particular device/user has visited the particular unsafe site/domain/URL. However, knowledge about the unsafe site/domain/URL being accessed can be useful in protecting others. In some instances, a site/domain/URL previously categorized as SAFE can be now (recently) changed in classification to UNSAFE.

A reporting mechanism can be configured to avoid timing correlations of data for the identification of an UNSAFE site/domain/URL. For example, the reporting of an UNSAFE site/domain/URL can be configured to be made after a random time period after the access and/or after accessing to the UNSAFE site/domain/URL have been made by more than a threshold number of accesses. For example, the administrator can be allowed to query for a count of computing devices that have been affected by the UNSAFE site/domain/URL but not the identifications of the particular devices that have been affected.

In some instances, the browsing history is stored in a local secure storage of Trusted Execution Environment (TEE). A security server may count the devices that are affected by an UNSAFE site/domain/URL. An administrator is allowed to query and obtain a count of the devices that are affected by an UNSAFE site/domain/URL in a set of devices administrated by the administrator, but not the identities of the devices. Optionally, the administrator may also query for the time instances of the accesses to the UNSAFE site/domain/URL. Optionally, the administrator may also request a device to provide user permission for further access to additional information about access to the UNSAFE site/domain/URL.

For example, enterprise administrators may want to see the domain/URL of a phishing site encountered by an enterprise user, but this can violate the user's privacy.

Preferably, default reporting to a security server or administrator identifies that there had been a phishing event without identifying the site/domain/URL (e.g., to preserve the user's privacy). The security system is configured to allow an enterprise administrator to perform a follow-up investigation of such a site/domain/URL based on user permission.

For example, after the administrator requests permission to see the identification of the site/domain/URL of the phishing event, the user of the device may review the request and selectively grant the permission or decline the request.

The client/user computing device can be configured to store the identification of the site/domain/URL involved in the reported phishing event. Upon request from an administrator, the user of the device can choose to grant the request to inspect the domain/URL or to deny the request.

If the request is granted, the identification of the site/domain/URL is sent to the administrator or a security server to facilitate further investigation.

If the request is not granted, the administrator or an automated response feature may apply certain security measures, such as marking the user's device and/or the user's account as not in compliance, and restricting or denying access of the user or the device to selected (or all) enterprise applications or services.

FIG. 1 shows a system in which techniques to protect user credential against phishing can be implemented.

The system of FIG. 1 includes one or more security servers (111) that are remote from user devices (121, . . . , 123). A typical user device (121) can have a security proxy (113) that is in communication with the security servers (111) to provide phishing protection for the use device (121).

For example, the user device (121) can have applications, such as an email (115), a web browser (117), and another application (119) (e.g., for text message, instant message, chart, and/or social networking).

The applications (115, 117, . . . , 119) running in the device can communicate with various sites hosted on servers (103, 105, . . . , 109) on the internet (101). In some instances, the applications (115, 117, . . . , 119) can send requests to, and/or receive responses from, the servers (103, 105, . . . , 109) without going thought the security server(s) (111).

The security proxy (113) is configured to monitor the activities in the user device (121) and/or in the applications (115, 117, . . . , 119), and apply security measures to protect the user of the device (121) against phishing attempts. Optionally and/or in combination, the security proxy (113) can be in the path of communications from the user device (121) and the Internet (101). The security proxy (113) does not just mediate communications to the security server(s) (111). The security proxy (113) can include a transparent client-side proxy that is in the path of communications from the user device (121) to the Internet (101) (or vice versa) and can be configured to blackhole network communications, and observe DNS requests or other network communications.

The security proxy (113) can be configured as a security module of an operating system of the user device (121), a security application running in the user device (121), and/or a component embedded in one or more of the applications (115, 117, . . . , 119).

In some instances, the security proxy (113) implements a transparent proxy server on the user device (121) (e.g., using a virtual private network (VPN) protocol). The transparent proxy server allows the data communication in and out of the user device (121) to be monitored and/or analyzed by the security proxy (113) and/or the security server (111) to detect phishing attempts and/or apply security measures.

In some instances, the security proxy (113) controls at least some aspects of network communications involving the user device (121), such as DNS (domain name system) resolution, such that the phishing attempts can be detected and security measures be applied via the control in the aspects of network communications.

For example, when an application (e.g., 115, 117, . . . , or 119) initiates an access to a website/domain/URL/file/message hosted on a server (103, 105, . . . , or 109), the security proxy (113) can detect the access and requests the security server (111) for a classification of the website/domain/URL/file/message.

To prevent excessive delay, the security server (111) may provide an initial response within a predetermined time window to indicate whether the website/domain/URL/file/message is safe, unsafe, or unclassified.

If the website/domain/URL/file/message is classified as being safe, the security proxy (113) may allow full access to the website/domain/URL/file/message without restrictions.

If the website/domain/URL/file/message is classified as being unsafe, the security proxy (113) may block the access to the website/domain/URL/file/message.

If the website/domain/URL/file/message is classified as being unclassified, the security proxy (113) may allow the application (e.g., 115, 117, . . . , or 119) to receive content from the server (103, 105, . . . , or 109) for an initial presentation, and apply one or more security measures to block some user interactions with the presentation to prevent phishing of user credentials (and/or other personal information).

To facilitate phishing classification, the security proxy (113) can transmit information about the website/domain/URL/file/message to the security server (111), such as the identifications of the website/domain/URL/file and/or the content of the website/domain/URL/file/message. In some instances, the security proxy (113) uploads, to the security server (111), the content obtained by the user device (121) from the server (103, 105, . . . , or 109); and the security server (111) can perform the computation based on a set of predetermined rules and/or using an artificial neural network training using a machine learning technique. If the website/domain/URL/file/message is initially determined to be unclassified, the security server (111) may render an image of the website/domain/URL/file/message for presentation on the user device (121) before the website/domain/URL/file/message is rendered interactive on the user device (121).

In some instances, the security proxy (113) also provides a security score of the user device (121) to the security server (111) for a response that is dependent on the security score. For example, in response to a request to resolve an address of a domain or URL, the security proxy (113) can transmit the identification domain or URL with the security score of the user device to a DNS server in the security servers (111) (e.g., via an EDNSO extension).

To protect user privacy, the security proxy (113) can be configured to transmit data/request to the security server (111) via an intermediate anonymization server that shields information about the user device (e.g., IP address) from the security server (111), where the content of the data/request can be protected via encryption made using a public key of the security server (111), or a secret key that is shared between the security proxy (113) and the security server (111). Thus, the intermediate anonymization server and/or other devices on the communication path between the security proxy (113) and the security server (111) cannot decrypt the encrypted content. For example, the security server(s) (111) illustrated in FIG. 1 can include an intermediate anonymization server configured between the security proxy (113) and a server that analyzes the data/request anonymized by the intermediate anonymization server to provide site classifications and/or security measure selections. In general, different security/privacy operations disclosed herein (e.g., anonymization, DNS services, content classification, determination of whether or not a site is a phishing site, selection and/or implementation of security measures, etc.) can be implemented in multiple servers (111), which may or may not be under the control of a same company or security service provider that provides software implementing the security proxy (113) in the user device (121). Further, different functions of the security proxy (113) can be implemented using multiple security modules, security applications, and/or security components running in the user device (121) and/or integrated in or with the operation system of the user device (121) and/or the individual applications (e.g., 115, 117, . . . , 119). Different security modules, security applications, and/or security components can be provided by different companies or security service providers. For example, the computation performed to determine whether or not a site is a phishing site can be configured in the infrastructure of a security company or security service provider, in the infrastructure of a third-party contacted by the infrastructure of a security company or security service provider or by a part of the security proxy (113), or in the security proxy (113); and the identifiers of known phishing sites (135) and the identifiers of known non-phishing sites (137) can be stored in a database or a file in the infrastructure of the security company or security service provider, the infrastructure of a third-party, and/or the user device (121). For example, in one embodiment, a server in the set of security servers (111) or a component of the security proxy (113) can initially determine the content classification of a site (e.g., news, media, political, social networking, financial) that is to be visited by a user device (e.g., 121 or 123) and, if the site does not have a known content classification, the server, the component of the security proxy (113), another server in the set of security servers (111), and/or another component of the security proxy (113) can be contacted to determine whether or not the site is a phishing site and/or whether or not to apply any security measure to the user device (e.g., 121 or 123) visiting the site, etc.

In some instances, the security proxy (113) maintains a list of sites/domains that are unsafe and/or a list of sites/domains that are safe. Thus, when the user device (121) accesses a site/domain that is not on the list(s) maintained by the security proxy (113), the security proxy (113) requests the security server (111) for a classification of the site/domain, and applies security measures selected based on the security score of the user device (121) while waiting for a response from the security server (111) and/or before the security server (111) finishes the computation for the classification.

The security proxy (113) can be configured to run in a Trusted Execution Environment (TEE) and store privacy sensitive data related to visitations to sites/domains/URL in a secure storage area that requires user permission for access (e.g., by an administrator, an external device or server). In an embodiment, part of the functionality of the security proxy (113) is performed in a Trusted Execution Environment (TEE) and part of the functionality of the security proxy (113) is performed outside the Trusted Execution Environment (TEE). For example, the storage of domains/URLs contacted and optionally the classification of the domains/URLs and optionally the action(s) the user took on a presentation of content from the domains/URLs can be configured to be performed in the Trusted Execution Environment (TEE) in secure storage, while the network communications mediated or controlled by the security proxy (113) can be configured to be performed outside the Trusted Execution Environment (TEE).

Optionally, a user device (e.g., 121) can include a contact list of a user of the user device (121). Each contact in the list can include a profile picture (e.g., photo, icon, image) that is representative of the contact. When a message identifies a sender that can be verified and/or confirmed to have send the message, the profile picture of a contact matching the sender identified in the message can be used in the presentation of the message. When the sender cannot be verified for a message, the message is presented with the profile picture.

Figure 2:
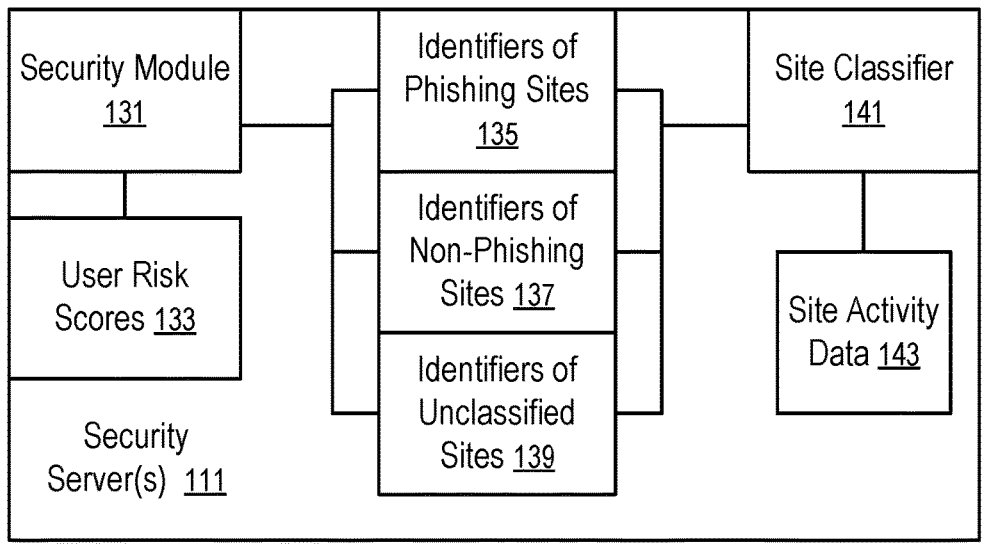
FIG. 2 shows a security server according to one embodiment.

FIG. 2 shows a security server (111) according to one embodiment. For example, the security server (111) of FIG. 2 can be used in the system of FIG. 1.

The security server (111) of FIG. 2 stores a list of identifiers of known phishing sites (135) (e.g., having detected/confirmed phishing activities or contents), a list of identifiers of known non-phish sites (137) (e.g., legitimate sites), and optionally some identifies of unclassified sites (139) that are to be classified via a site classifier (141). The site classifier (141) can be programmed via a set of predefined rules and/or an artificial neural network that is trained to classify a site using a machine learning technique (e.g., using a supervised machine learning technique based on the known identifies of phishing sites (135) and the known identifiers of non-phishing sites (137) and site activity data (143)).

Optionally, the site classifier (141) can be trained to generate a phishing score of a given site. The phishing score is indicative of the likelihood of a site being a phishing threat. The training can be a combination of one or more of supervised learning, unsupervised learning, or deep learning.

In one implementation, when the phishing score of a site is above a threshold, the site can be identified as a phishing site; and otherwise, the site can be identified as a non-phishing site.

Alternatively, when the phishing score of a site is above an upper threshold, the site can be identified as a phishing site; when the phishing score of a site is below a lower threshold, the site can be identified as a non-phishing site; and otherwise, the site can be identified as an unclassified site, which is to be investigated by a representative or the user. For example, the user of a user device (121) may be prompted to answer whether the site is to be classified as phishing or non-phishing. The answer from the user and/or the representative can be used to further train or program the site classifier.

The security server (111) of FIG. 2 includes a security module (131) can communicates with the user devices (121) to provide phishing protection. The communications between the security server (111) and the user devices (121) can be optionally configured to go through one or more anonymization servers for user privacy.

The security server (111) of FIG. 2 stores user risk scores (133) (e.g., generated from asking users to classify sites and/or from phishing test/simulation campaign). The risk scores (133) can include a component indicative the risk factor of a user assessed based on the role of the user in an enterprise. For example, the role of the user can be relative to the organization/enterprise, such as "user is in Finance", "user is a developer", "user is a manager", "user is the CFO" (or other executive), etc. The role itself may not relate to the network of computing devices. Alternatively, the user risk scores (133) can be configured on the user devices (121, . . . , 123) that are communicated to the security server (111) without revealing the identities of the users and/or the devices (121, . . . , 123) (e.g., through the use of temporary unique identifiers and/or anonymization servers). The risk score can be calculated and/or dynamically updated based on the roles of the users and/or measurements indicating the behaviors/patterns of the user, such as the test scores collected during phishing education, results of phishing test/ simulation campaign, and/or statistics of user engaging in risky activities (e.g., sideloading applications, clicking to visit known phishing sites, clicking through unclassified sites that are subsequently identified as phishing sites, providing text inputs to unclassified sites that have been blackholed and/or that are subsequently identified as phishing sites, failing to pass enterprise security tests, etc.).

A portion of the lists of the site identifiers (135, 137, and/or 139) can be stored in the security proxies (113) of the user devices (121) such that network communications used to identify the classification of some of the sites and the associated delay can be reduced.

Figure 3:
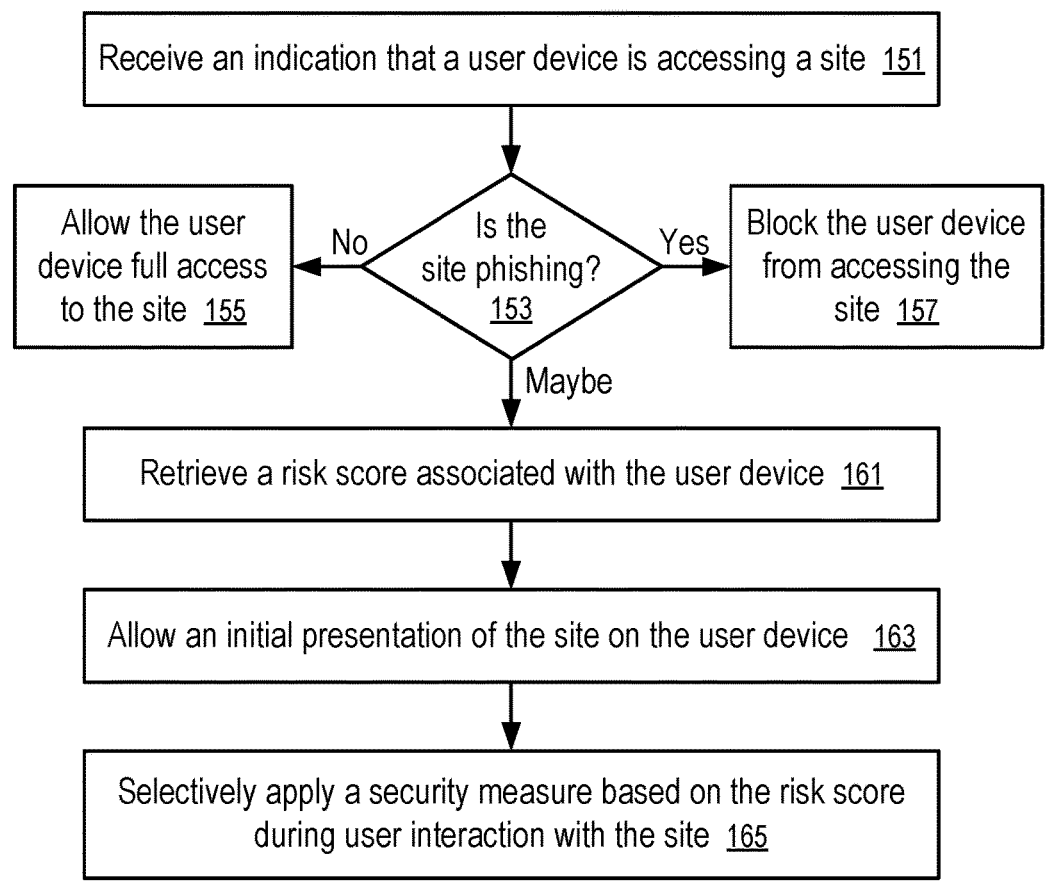
FIG. 3 shows a method to process an unclassified site according to one embodiment.

FIG. 3 shows a method to process an unclassified site according to one embodiment. For example, the method of FIG. 3 can be implemented in the system of FIG. 1 and/or with the use of the server (111) of FIG. 2.

In FIG. 3, after receiving (151) an indication that a user device (121) is accessing a site (e.g., hosted on a server (103, 105, . . . , 109)), the security proxy (113) and/or the security server (111) determines (153) whether the site is phishing.

If it is determined (153) that the site is not phishing, the security proxy (113) allows (155) the user device (121) full access to the site.

If it is determined (153) that the site is phishing, the security proxy (113) blocks (157) the user device (121) from accessing the site.

Otherwise, the security proxy (113) and/or the security server (111) retrieves (161) a risk score associated with the user device, allows (163) an initial presentation of the site on the user device (121), and selectively applies (165) a security measure based on the risk score during user interaction with the site (e.g., while the site remains to be unclassified respect to phishing risk).

Figure 4:
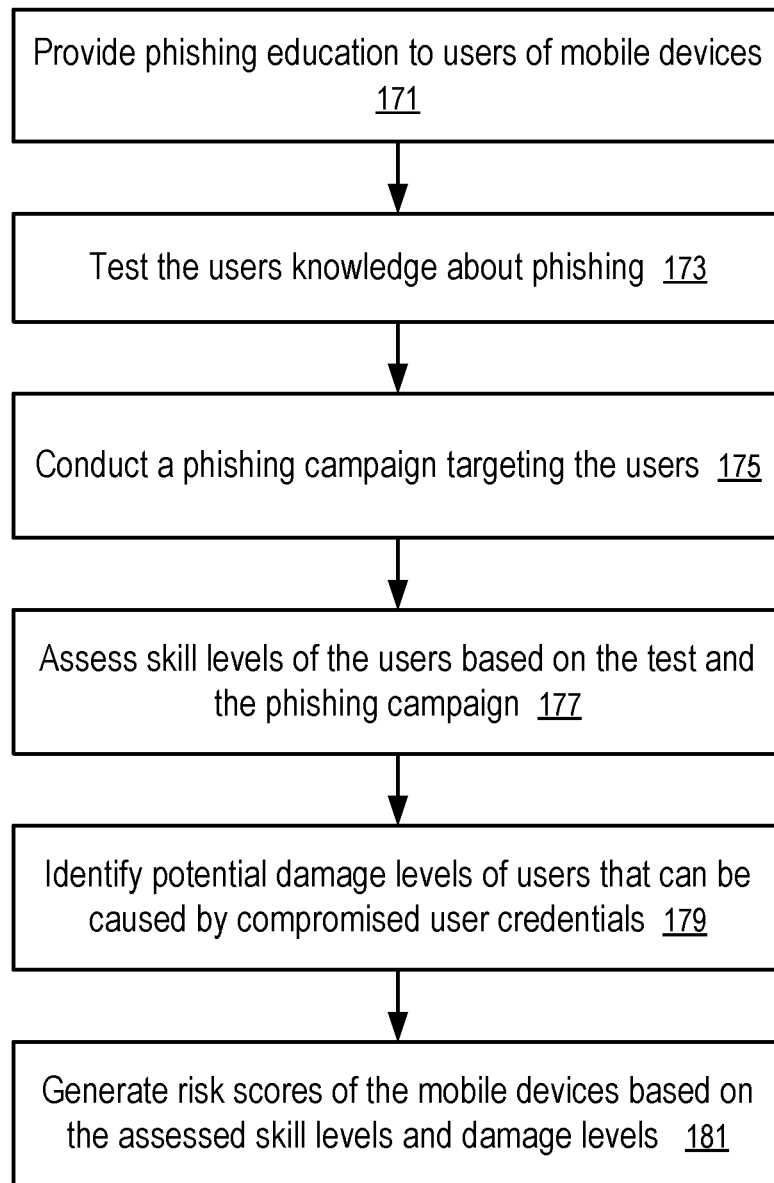
FIG. 4 shows a method to generate risk scores according to one embodiment.

FIG. 4 shows a method to generate risk scores according to one embodiment. For example, the risk score generated using the method of FIG. 4 can be used in the method of FIG. 3. The risk score can be generated in the security proxy (113) of the user device (121) and/or in the security server (111) of FIG. 2.

In FIG. 4, user devices (e.g., 121, . . . , 123) provide (171) phishing education to users of mobile devices (e.g., 121, . . . , 123). The user devices (e.g., 121, . . . , 123) test (173) the users' knowledge about phishing. The security server (111) may use selected sites (e.g., 103) hosted on the internet (101) to conduct (175) a phishing campaign targeting the users. The campaign is configured a test or simulation. The security server (111) and/or the security proxy (113) can be configured to whitelist the campaign such that the users are not initially protected against and/or alerted about the phishing attempts of the test/simulation. The security server (111) and/or the security proxy (113) can assess (177) skill levels of the users based on the test and the phishing campaign. Further, the potential damage levels of users that can be caused by compromised user credentials can be identified (179) (e.g., based on the roles of the users in an enterprise/company/organization). The security server (111) and/or the security proxy (113) can generate (181) risk scores of the mobile devices (e.g., 121, . . . , 123) based on the assessed skill levels and damage levels.

Figure 5:
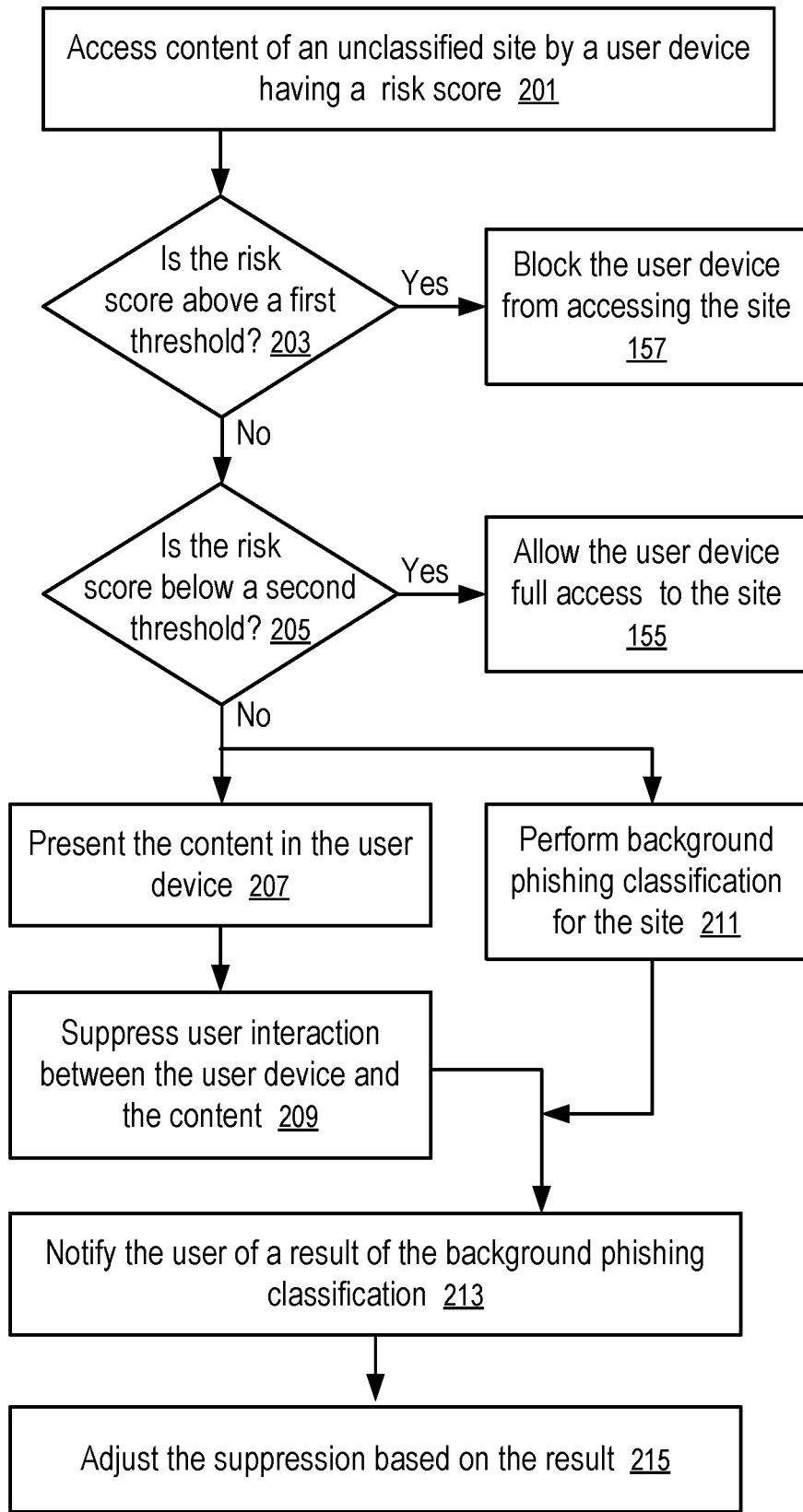
FIG. 5 shows a method to process an unclassified site based on a risk score according to one embodiment.

FIG. 5 shows a method to process an unclassified site based on a risk score according to one embodiment. For example, the risk score generated using the method of FIG. 4 can be used in the method of FIG. 5; and the method of FIG. 5 can be implemented in the system of FIG. 1 and/or with the use of the server (111) of FIG. 2.

In FIG. 5, when a user device (121) having a risk score is to access (201) content of an unclassified site, it is determined (203) whether the risk score is above a first threshold.

If it is determined (203) that the risk score is above the first threshold, the security proxy (113) blocks (157) the user device (121) from accessing the site (e.g., as in the method of FIG. 3); otherwise, it is determined (205) whether the risk score is below a second threshold.

If it is determined (205) that the risk score is below the second threshold, the security proxy (113) allows (155) the user device (121) full access to the site (e.g., as in the method of FIG. 3); otherwise, the security proxy (113) allows the user device (121) to present (207) the content of the unclassified site, while the security server (111) and/or the security proxy (113) can concurrently perform (211) background phishing classification for the site.

Before the completion of the phishing classification performed in the background, the security proxy (113) and/or the security server (111) can suppress (209) at least some user interactions between the user device (121) and the content (209) and/or the unclassified site. For example, text entry and/or transmission of entered text can be blocked for the unclassified site.

Upon the completion of the phishing classification (211), the security proxy (113) can optionally notify (213) the user of the result of the background phishing classification and adjust (215) the suppression based on the result.

For example, if the result indicates that the unclassified site is not phishing, the security proxy (113) allows (155) the user device (121) full access to the site; and otherwise, the security proxy (113) blocks (157) the user device (121) from accessing the site.

Figure 6:
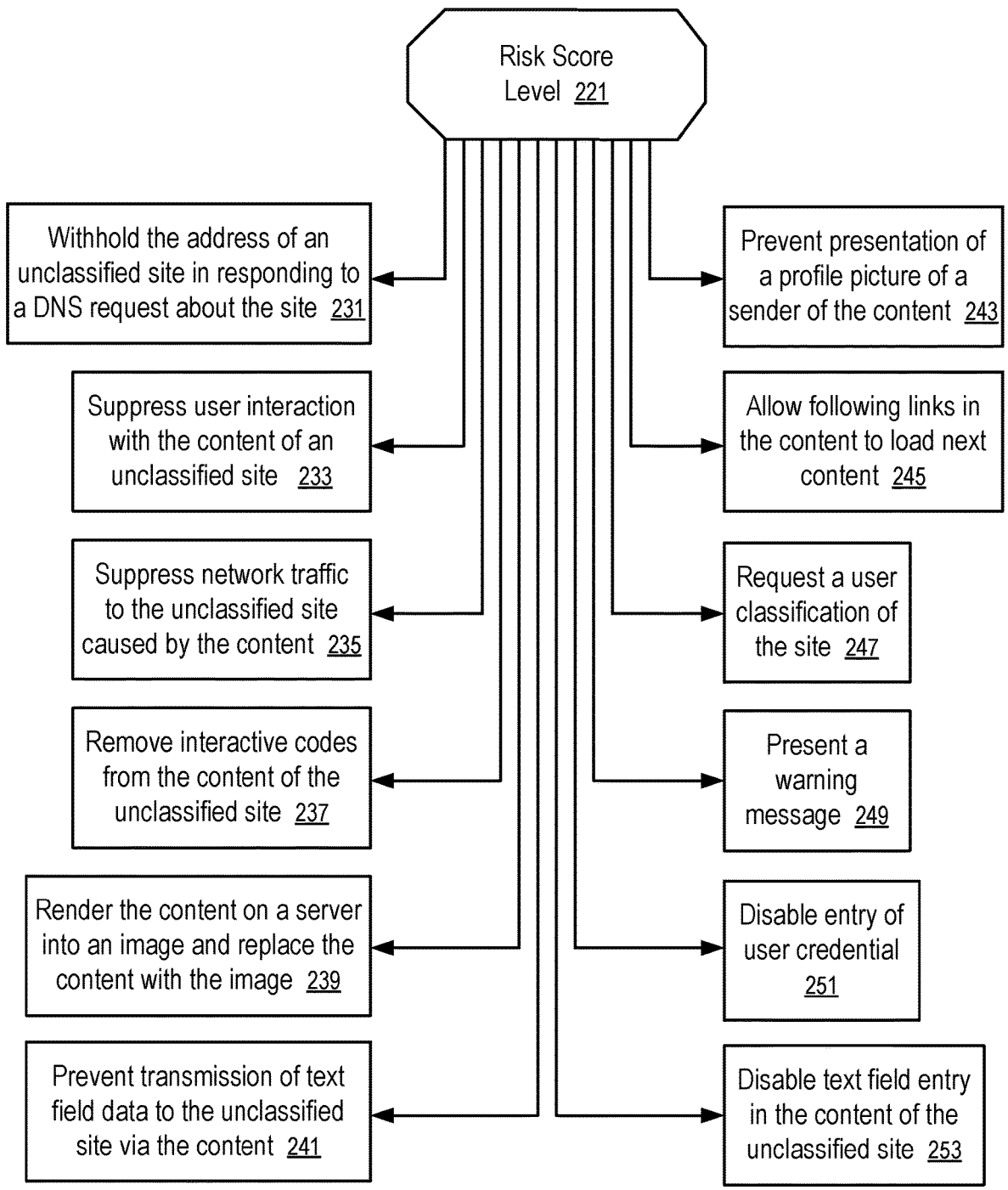
FIG. 6 illustrates examples of customization of security measures applicable to a visit to an unclassified site.

FIG. 6 illustrates examples of customization of security measures applicable to a visit to an unclassified site. For example, some of the examples illustrated in FIG. 6 can be used to implement a portion of FIG. 5 when the risk score of a user/computing device is between an upper threshold and a lower threshold. For example, the risk scores generated using the method of FIG. 4 can be used in the examples illustrated in FIG. 6; and the security measures illustrated in FIG. 6 can be applied via the security server (111) of FIG. 2 and the security proxy (113) illustrated in FIG. 1.

Based on the risk score level (221) of a user device (121), the security proxy (113) and/or the security server (111) apply some or all of the security measures illustrated in FIG. 6.

For example, a security server (111) and/or the security proxy (113) can be configured to withhold (231) the address of an unclassified site in responding to a DNS request about the site.

For example, the security proxy (113) can suppress (233) user interaction with the content of an unclassified site and/or suppress (235) network traffic to the unclassified site caused by the content.

For example, the security server (111) and/or the security proxy (113) can remove (237) interactive codes from the content of the unclassified site for initial presentation of the content without the original interactive functionalities of the content.

For example, the security server (111) can render (239) the content into an image; and the security proxy (113) can replace the content with the image for initial presentation of the unclassified site.

For example, the security server (111) and/or the security proxy (113) can prevent (241) transmission of text field data to the unclassified site via the content presented on the user device (121).

For example, the security proxy (113) can disable (253) text field entry in the content of the unclassified site (e.g., through an assistive technology API or an overlay that intercepts the input).

For example, the security proxy (113) can disable (251) entry of user credential (251) (e.g., via a browser component, through an assistive technology API or an overlay that intercepts the input).

For example, the security proxy (113) can present (249) a warning message that reminds the user of the phishing threat, and/or request (247) the user to provide a classification of the site.

Optionally, the security proxy (113) can allow (245) the user to following pre-formed links in the content to load next content (245) while blocking other forms of user interaction, such as text entry or entry of user credential.

Optionally, the security proxy (113) can prevent (243) presentation of a profile picture of a sender of the content (e.g., when the sender cannot be verified).

Figure 7:
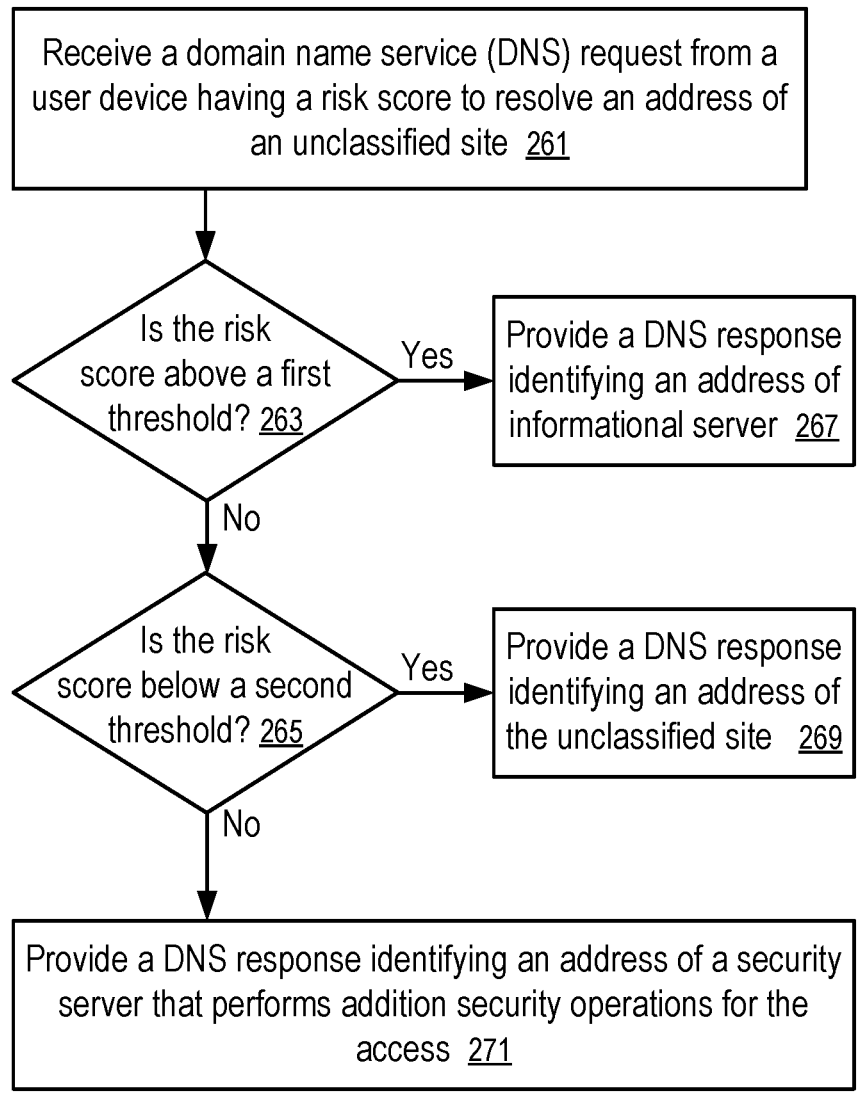
FIG. 7 shows a method to customize a DNS response for an unclassified site according to one embodiment.

FIG. 7 shows a method to customize a DNS response for an unclassified site according to one embodiment. For example, the method of FIG. 7 can be implemented in a security server (111) with or without the use of a security proxy (113). For example, the method of FIG. 7 can be used to implement the security measure of withholding (231) the address of an unclassified site illustrated in FIG. 6. For example, the risk scores generated using the method of FIG. 4 can be used in the examples illustrated in FIG. 7.

In FIG. 7, when a security server (111) and/or a security proxy (113) receives a domain name service (DNS) request from a user device (121) having a risk score, requesting the security server (111) and/or the security proxy (113) to resolve an address of an unclassified site (261), the security server (111) and/or the security proxy (113) can determine (263) whether the risk score is above a first threshold.

If it is determined (263) that the risk score is above the first threshold, the security server (111) and/or the security proxy (113) can provide (267) a DNS response identifying an address of an informational server, which prevents the user from accessing the unclassified site. Otherwise, it is determined (265) whether the risk score below a second threshold.

If it is determined (265) that the risk score is below the second threshold, the security server (111) and/or the security proxy (113) can provide (269) a DNS response identifying an address of the unclassified site, which allows the user to initially retrieve the content from the unclassified site.

Otherwise, when the risk score is between the first and second thresholds, the security server (111) and/or the security proxy (113) can provide (271) a DNS response identifying an address of a security server (e.g., 111 or another server) that performs addition security operations for the access.

Figure 8:
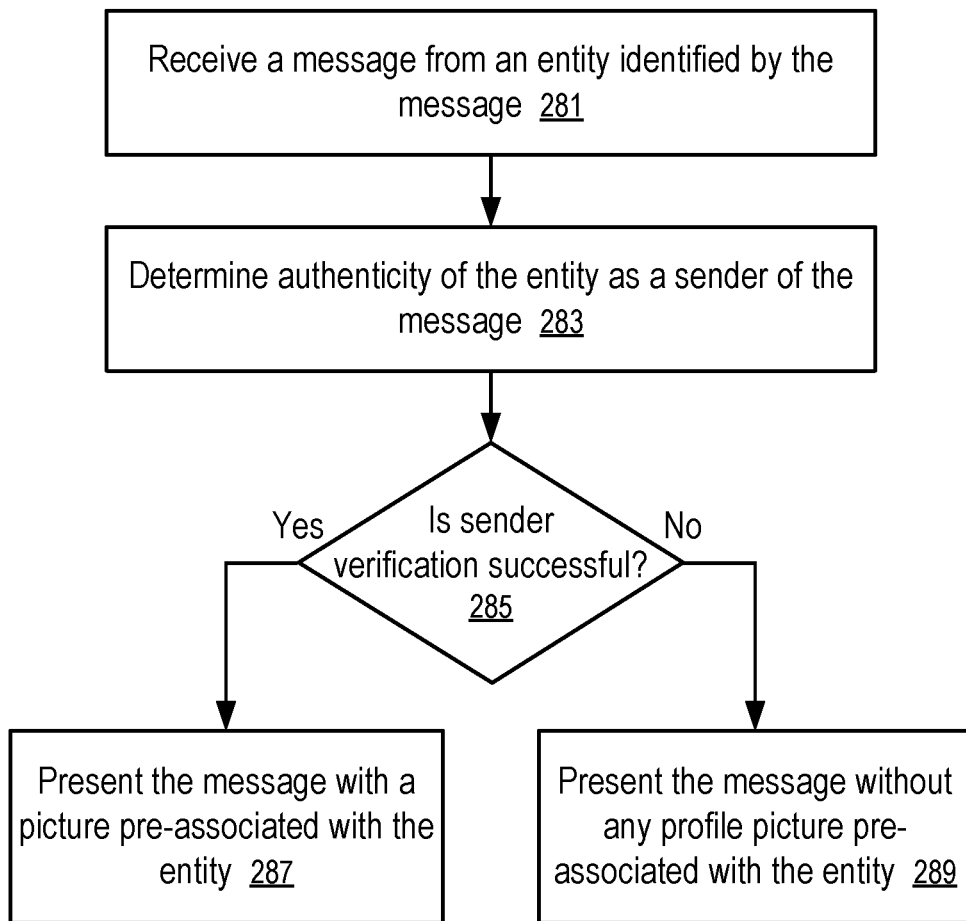
FIG. 8 shows a method to customize the display of contact pictures according to one embodiment.

FIG. 8 shows a method to customize the display of contact pictures according to one embodiment. For example, the method of FIG. 8 can be implemented in a security proxy (113) with or without the use of a security server (111). For example, the method of FIG. 8 can be used to implement the security measure of preventing (243) the presentation of a profile picture of a sender of the content illustrated in FIG. 6. For example, the method of FIG. 8 can be applied when the risk score generated using the method of FIG. 4 is above a threshold.

In FIG. 8, a message (281) is received (281) in an application (e.g., 115, 117, or 119), where the message (281) identifies an entity as a sender of the message (281). The security proxy (113) and/or the security server (111) can determine (283) the authenticity of the entity as the sender of the message.

If it is determined (285) that the sender verification is successful, the security proxy (113) allows the application (e.g., 115, 117, or 119) to present (287) the message with a picture pre-associated with the entity (e.g., in a contact list of the user).

Otherwise, the message is presented (289) without any profile picture pre-associated with the entity. Optionally, a pre-selected icon/picture configured warn user of spoofing and/or phishing can be presented to alert the user of potential phishing risks.

Figure 9:
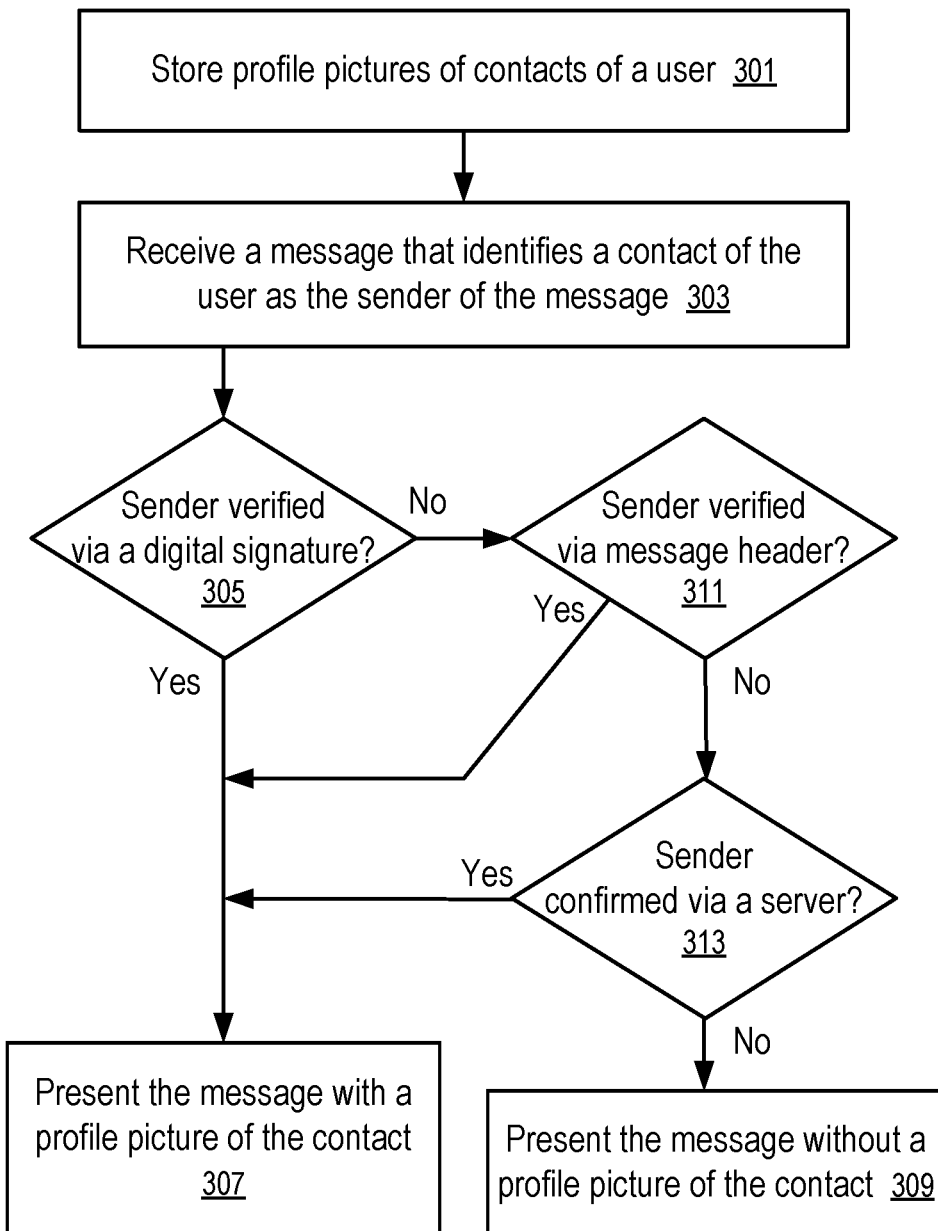
FIG. 9 shows a method to display a message according to one embodiment.

FIG. 9 shows a method to display a message according to one embodiment. For example, the method of FIG. 9 can be used in the implementation of the method of FIG. 8.

In FIG. 9, a user device stores (301) profile pictures of contacts of a user. An application (115, 117, . . . , or 119) can receive (303) a message that identifies one of the contacts of the user as the sender of the message. The security proxy (113) can determine (305) whether the sender can be verified via a digital signature; and if so, the application (115, 117, . . . , or 119) can be allowed to present (307) the message with a profile picture of the contact.

Otherwise (305), it can be further determined (311) whether the sender can be verified via inspecting the message header (311); and if so, the application (115, 117, . . . , or 119) can be allowed to present (307) the message with a profile picture of the contact.

Otherwise (311), it can be further determined (313) whether the sender can be confirmed via a server that is known to be authorized to initiate messages in the domain of the address of the sender; and if so, the application (115, 117, . . . , or 119) can be allowed to present (307) the message with a profile picture of the contact.

Otherwise (313), when the sender cannot be verified, the security proxy (113) can cause the application (115, 117, . . . , or 119) to present (309) the message without a profile picture of the contact (and optionally with a warning indicator, such as a profile picture pre-configured for warning against phishing and/or spoofing).

Figure 10:
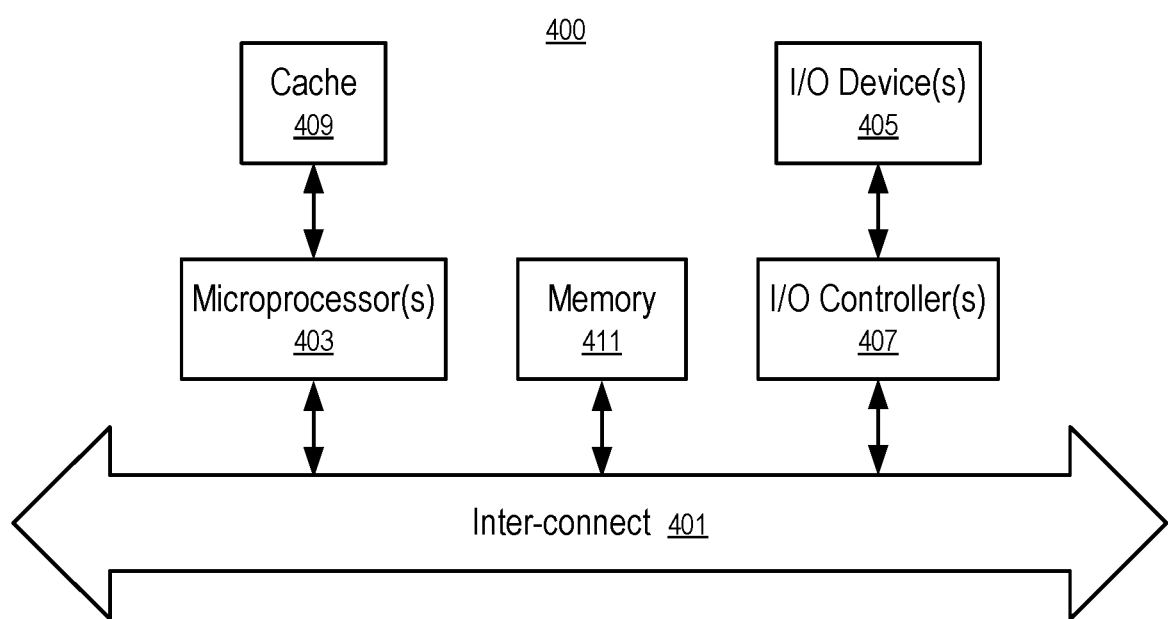
FIG. 10 shows a data processing system on which the methods of the present disclosure can be implemented.

The user devices (e.g., 121, . . . , 123), the security server(s) (111) and/or the servers (e.g., 103, 105, . . . , 109) can each be implemented using one or more data processing systems illustrated in FIG. 10.

The present disclosure includes the methods discussed above, computing apparatuses configured to perform methods, and computer storage media storing instructions which when executed on the computing apparatuses causes the computing apparatuses to perform the methods.

FIG. 10 shows a data processing system on which the methods of the present disclosure can be implemented. While FIG. 10 illustrates various components of a computer system, it is not intended to represent any particular architecture or manner of interconnecting the components. One embodiment may use other systems that have fewer or more components than those shown in FIG. 10.

In FIG. 10, the data processing system (400) includes an inter-connect (401) (e.g., bus and system core logic), which interconnects a microprocessor(s) (403) and memory (411). The microprocessor (403) is coupled to cache memory (409) in the example of FIG. 10.

In one embodiment, the inter-connect (401) interconnects the microprocessor(s) (403) and the memory (411) together and also interconnects them to input/output (I/O) device(s) (405) via I/O controller(s) (407). I/O devices (405) may include a display device and/or peripheral devices, such as mice, keyboards, modems, network interfaces, printers, scanners, video cameras and other devices known in the art. In one embodiment, when the data processing system is a server system, some of the I/O devices (405), such as printers, scanners, mice, and/or keyboards, are optional.

In one embodiment, the inter-connect (401) includes one or more buses connected to one another through various bridges, controllers and/or adapters. In one embodiment the I/O controllers (407) include a USB (Universal Serial Bus) adapter for controlling USB peripherals, and/or an IEEE-1394 bus adapter for controlling IEEE-1394 peripherals.

In one embodiment, the memory (411) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one aspect, a method includes: receiving, in a computing device (e.g., 121), a request from a user of the computing device (121) to access a content from a site (e.g., hosted on a server (103)) that is connected to the computing device (121) via a computer network (e.g., the internet (101)); and responsive to the user request, communicating between the computing device (121) and a server computer (111), to protect the user of the computing device (121) from phishing threats, where the server computer (111) is configured to classify the site as having a status of phishing, having a status of not phishing, or having a status of unknown regarding phishing. In response to a determination that the site is classified as having the status of unknown regarding phishing, the method can further includes: determining a risk score (221) of the computing device (121) based on a role of the user in an enterprise/organization/company/network having a plurality of computing devices (e.g., 121, . . . , 123) and a degree of phishing susceptibility of the user; selecting, based on the risk score (221), a security measure from a plurality of security measures (e.g., illustrated in FIG. 6); and applying the security measure to the processing of the content on the computing device.

For example, in the method of this aspect, accessing to the content is to be blocked (157) if the site is classified as having the status of phishing; and accessing to the content is to be allowed (155) if the site is classified as having the status of not phishing; and in response to the determination that the site is classified as having the status of unknown regarding phishing, the method can further include allowing (163) a presentation of the content on the computation device (121), where the selected security measure is applied (165) to prevent at least some of interactions between the user and the content.

For example, during the initial presentation (207) of the content on the computing device (121), the server computer (111) is configured to perform (211) further computations to classify the site as either having a status of phishing or having a status of not phishing. Optionally, the further computations can be performed (211) based on a machine learning technique and an artificial neural network used to analyze at least the content of the site.

In general, the background phishing classification can be performed in the computing device (121) and/or in the server server computer (111). The method of this aspect can further include: determining, from the further computation (211), a classification of the site regarding phishing, during the presentation (207) of the content and after the applying (165) of the security measure that is responsive to the initial determination (153) that the site is classified as having the status of unknown regarding phishing; communicating the classification between the computing device and the server computer; and adjusting (215) the security measure according to the classification.

Optionally, the communications between the computing device (121) and the server computer (111) can be in accordance with a virtual private network protocol; and the computing device (121) can be a mobile device that is capable of accessing the site (e.g., hosted on the server (103, 105, . . . , and/or 109) without going through the server computer (111).

Optionally, a security module (e.g., security proxy (113)) can be configured on the mobile device to perform the communication with the server computer (111) in identifying the determination that the site is classified as having the status of unknown regarding phishing and apply (165) the security measure in communication with the server computer (111).

Optionally, the applying (165) of the security measure includes the security module (e.g., 113) intercepting text inputs to an application (e.g., 115, 117, . . . , 119) running in the mobile device (121) using an assistive technology application programming interface (API) and preventing (241) transmission of the text inputs, over the computer network (e.g., 101) according to the content of the unclassified site presented in the mobile device (121).

Optionally, the applying (165) of the security measure includes rendering (239) the content on the server computer (111) into an image and presenting the image on the mobile device (121) without the interactive components of the unclassified site.

Optionally, the applying (165) of the security measure includes applying a transparent overly over the content of the unclassified site presented on the mobile device (121) to disable (253) text field entry in the content of the unclassified site.

Optionally, the applying (165) of the security measure includes the security module (e.g., 113), configured as an extension or component of a browser (117) (or another application (119) being used to access the unclassified site), to intercept text inputs to the browser running in the mobile device and prevent (241) transmission of the text inputs over the computer network (e.g., 101).

Optionally, the method of the aspect includes implementing, by the security module (e.g., 113) on the mobile device (121), a proxy server for the mobile device (121) to access contents over the computer network (101). The proxy server implemented on the mobile device (121) can be used to monitor and/or control the network activities and/or content of the unclassified site. The security module (e.g., 113) can store privacy sensitive information on the mobile device (121) for access based on user permission and/or communicate with the security server (111) in a privacy preserving way.

Optionally, the method of the aspect includes: receiving, from the user, a permission that allows the security module to access contents to be presented on the computing device; anonymizing, by the security module, data transmitted to the server computer (111) in the communicating between the computing device (121) and the server computer (111); storing, in the computing device, data identifying visitations of the computing device (121) to sites having the status of phishing, where an administrator of the network of computing devices is limited to query for a count of devices that have visited a site without identification of the devices that have visited the site; and/or reporting to the administrator an occurrence of a visitation to a particular site having the status of phishing without identification of the particular site, where a permission from the user allows the administrator to retrieve identification of the particular site.

Optionally, the method of the aspect includes: conducting (175) a phishing campaign exercise; and evaluating (e.g., 177) the degree of phishing susceptibility of the user based on a result of the phishing campaign exercise. Optionally, the method of the aspect can further include whitelisting the phishing campaign exercise in the server computer (111) and/or the user device (121) via identification of sites used in the exercise, time duration of the exercise, and user devices targeted by the exercise, where the server computer (111) and/or the security proxy (113) can be configured to classify contents whitelisted for the exercise as having the status of not phishing, based on the identification of sites used in the exercise, the time duration of the exercise, and the user devices targeted by the exercise.

Optionally, in the method of the aspect, the communicating, between the computing device (121) and the server computer (111), to protect the user of the computing device (121) from phishing threats, includes: transmitting, from the computing device (121) to the server computer (111), a domain name system (DNS) request identifying the site, where the server computer (111) generates a domain name system (DNS) response for the request, and the response includes an address identified based on the risk score when the site is classified as having the status of unknown regarding phishing; receiving, in the computing device (121), the response; and communicating, using the address provided in the response to retrieve information.

Optionally, in the method of the aspect, when the risk score is above a first threshold, the address provided (267) in the response is an address of an information server that inform the user of phishing risk; when the risk score is below a second threshold, the address provided (269) in the response is an address of the site; and when the risk score is between the first threshold and the second threshold, the address provided (271) in the response is an address of a further server that is configured to authenticate or verify the user or the computing device.

For example, a mobile device can be configured to perform the method of the aspect. The mobile device can include: at least one microprocessor (403); a communication device (e.g., 405) configured to communicate over internet; memory (411) configured to store instructions, including a first application (e.g., 115, 117, . . . , 119) and a second application (113) When the first application (115) receives a request from a user of the mobile device (121) to access a content from a site over the internet, the second application (113) executed by the at least one microprocessor is configured to the method of the aspect.

Optionally, in the method of the aspect, the server computer (111) can be configured as a DNS resolver/server to resolve addresses of sites; and the security measure causes an address of the site to be provided (271) to the first application (e.g., 115, 117, . . . , 119) to load the content in response to the user request when the risk score is below a threshold, and an address of an alternative site to be provided (267 or 269) to the first application in response to the user request when the risk score is above the threshold.

A non-transitory computer storage medium (e.g., 409, 411) stores a security module (113) of a mobile device (121), where the security module (113) has instructions which when executed on the mobile device (121), cause the mobile device (121) to perform the method of the aspect. For example, responsive to a request from a user of the mobile device (121) to access a content from a site over internet, the mobile device (121) communicates with the server computer (113) to protect the user of the mobile device (121) from phishing threats, where the server computer (111) and/or the security module (113) can initially classify the site as having a status of phishing, having a status of not phishing, or having a status of unknown regarding phishing. In response to a determination that the site is initially classified as having the status of unknown regarding phishing, The mobile device (121) controlled by the security module (113): identifies a risk score (221) of the mobile device determined based on a role of the user in an enterprise/company/organization/network having mobile devices (121, . . . , 123) and a degree of phishing susceptibility of the user; selects, based on the risk score (221), a security measure from a plurality of security measures (e.g., illustrated in FIG. 6); allows (163) an initial presentation of the content on the mobile device (121); and applies (165) the security measure to user interactions with the content presented on the mobile device (121).

In another aspect, a mobile device (121) includes: at least one microprocessor (403); a communication device (e.g., 405) configured to communicate over internet (101); and memory (411) configured to store a security module (113). When a user of the mobile device (121) requests to access a content from a site over the internet (101), the security module (113) executed by the at least one microprocessor (403) is configured to: transmit a request to a server computer (111), where the server computer (111) is configured to identify, within a predetermined period of time from the request received in the server computer (111), whether or not the site is phishing for information; and in response the server computer (111) failing to make a determination, within the predetermined period of time, as to whether or not the site is phishing for information: allow (163) a presentation of content from the site on the mobile device (121); and disable (e.g., 165) at least a portion of user interactions programmed in the content.

Optionally, the disabled portion of user interactions includes collecting text inputs on the mobile device.

Optionally, the disabled portion of user interactions includes transmitting text inputs collected on the mobile device via or according to the content from the site.

Optionally, the disabled portion of user interactions includes users interactions implemented via interactive codes programmed in the content from the site.

Optionally, the disabled portion of user interactions is implemented via the security module (113) disabling entry of user credential in the content rendered on the mobile device (121).

Optionally, the security module (113) is configured to request the user to classify whether or not the site is phishing.

Optionally, the security module (113) is configured to present, to the user, a warning message of phishing risk, in response to the server computer failing to make the determination, within the predetermined period of time, as to whether or not the site is phishing for information.

Optionally, the server computer (111) is configured to continue computations to classify whether or not the site is phishing for information after the predetermined period of time; the security module (113) is configured to subsequently receive, from the server computer (111), an indication that the site is determined to be either phishing or not phishing; and in response, the security module (113) is configured to adjust (215) security operations based on the indication.

For example, the security module (113) is optionally configured to block further access to the site when the indication is that the site is determined to be phishing. For example, the security module is optionally configured to enable the previously disabled portion of user interactions when the indication is that the site is determined to be not phishing. For example, the security module (113) is optionally configured to disable the portion of user interactions via intercepting text inputs to an application (e.g., 115, 117, . . . , 119) running in the mobile device (121), through an assistive technology application programming interface to the application (e.g., 115, 117, . . . , 119), and withhold the intercepted text inputs from the application (e.g., 115, 117, . . . , 119) until the server computer (111) determines that the site is not phishing.

For example, the security module (113) is optionally configured to disable the portion of user interactions via replacing (239) the content with an image of the content rendered on the server computer (111) as the presentation of the content on the mobile device (121).

For example, the security module (113) is optionally configured to disable the portion of user interactions via applying a transparent overlay over the content presented on the mobile device (121) to absorb user inputs, until the server computer (111) determines that the site is not phishing.

For example, the security module (113) is optionally configured to disable the portion of user interactions with the content presented in an application (e.g., 115, 117, . . . , 119) running in the mobile device via an extension or component of the application (e.g., 115, 117, . . . , 119) intercepting text inputs to the application (e.g., 115, 117, . . . , 119) and prevent transmission of the text inputs over the internet, until the server computer (111) determines that the site is not phishing. The transmission of the text inputs over the internet can be prevented via silently discard network traffic (e.g., blackholing) directed to the internet and/or locations specified in the content of the site.

For example, the security module (113) is optionally configured to implement a proxy server on the mobile device to interface the mobile device and the internet. Monitoring accesses to unclassified sites can be made in the proxy server; and some security measures (e.g., blackholing) can be implemented in the proxy server. Optionally, the security module (113) communicates with the server computer (111) via a virtual private network protocol in implementing the proxy server on the mobile device (121).

The instructions configured for the mobile device (121) if the aspect can be stored in a non-transitory computer storage medium (e.g., 409, 411, for loading into the mobile device (121)).

In a further aspect, a security server (111) includes: at least one microprocessor (403); a communication device (e.g. 405) configured to communicate over internet (1010; and memory (411) configured to store instructions which when executed by the at least one microprocessor (403) cause the security server (111) to: receive a request from a mobile device (121) that has received a request from a user to access a content from a site over the internet, where the request received from the mobile device (121) identifies the site; and identify, within a predetermined period of time from the request received from the mobile device (121), whether or not the site is phishing for information. In response a determination that the site has not been preclassified, before the request received from the mobile device, as to whether or not the site is phishing for information, the instructions executed by the at least one microprocessor (403) further cause the security server (111) to: provide an initial response to the request received from the mobile device (121) to cause the mobile device (121) to: allow (163) an initial presentation of content from the site on the mobile device (121); and disable (e.g., 165) at least a portion of user interactions programmed in the content. In response a determination that the site has not been preclassified, the instructions executed by the at least one microprocessor (403) further cause the security server (111) to: perform (211) computations to classify whether or not the site is phishing for information after the initial response; and provide a subsequent response having an indication that the site is determined to be either phishing or not phishing, to cause the mobile device (121) to adjust (215) security operations based on the indication. For example, the computations performed (211) in the background for phishing classification can be optionally programmed based on a machine learning technique and an artificial neural network configured to analyze at least the content of the site.

In the security server (111) of the aspect, the instructions executed by the at least one microprocessor can be optionally configured to further cause the security server to: receive parameters of a scheduled phishing campaign, where the parameters include identifications of sites used in the phishing campaign, a time duration of the phishing campaign, and user devices targeted by the phishing campaign; and classify contents of sites used in the scheduled phishing campaign as not phishing in response the user devices targeted by the phishing campaign accessing the contents of the sites within the time duration. The result of the phishing campaign can be used to measure degrees of phishing susceptibility of user devices.

The instructions configured for the security server (111) of the aspect can be stored in a non-transitory computer storage medium (e.g., 409, 411, for loading into the mobile device (121)).

In yet another aspect, a computing device (121 and/or 111) includes: at least one microprocessor (403); a communication device (e.g., 405) configured to communicate over internet (101); and memory (411) configured to store instructions which, when executed by the at least one microprocessor, cause the computing device (121 and/or 111) to: maintain a contact list of a user of the computing device (121 and/or 111); store (301), at least for one contact identified in the contact list, a profile picture of the contact identified in the contact list of the user; receive (303) a message identifying a sender of the message; determine that the sender identified by the message corresponds to the contact identified in the contact list of the user; determine (283) whether the contact has sent the message; and present the message on the computing device, wherein the message is presented (289) without the profile picture in response to the computing device (121 and/or 111) failing to verify that the contact has sent the message, and presented (287) with the profile picture in response to successfully verifying that the contact has sent the message.

For example, the message is an email message; the message identifies the sender via a name in a "from" field of the email message; and the sender is determined to correspond to the contact based on the name matching with the contact in the contact list of the user.

For example, the message is an email message; the message identifies the sender via a name in a "reply-to" field of the email message; and the sender is determined to correspond to the contact based on the name matching with the contact in the contact list of the user.

For example, the message is an email message; the message identifies the sender via an email address in a "from" field or a "reply-to" field of the email message; and the sender is determined to correspond to the contact based on the email address matching with the contact in the contact list of the user.

In the computing device (121 and/or 111) of the aspect, the instructions, when executed by the at least one microprocessor (403), can be optionally configured to cause the computing device (121 and/or 111) to analyze a header of the message in determining whether the contact has sent the message, such as determining whether the header of the message includes a record of transmission by a server of a domain associated with an address of the sender of the message, and/or determining whether the message is from a domain associated with an address of the sender of the message based on information provided via sender policy framework.

In the computing device (121 and/or 111) of the aspect, the instructions, when executed by the at least one microprocessor (403), can be optionally configured to cause the computing device (121 and/or 111) to verify (305) whether the message has a digital signature of the contact in determining whether the contact has sent the message.

In the computing device (121 and/or 111) of the aspect, the instructions, when executed by the at least one microprocessor (403), can be optionally configured to cause the computing device (121 and/or 111) to identify a trusted server that originates the message and communicate with the trusted server to verify an origin of the message in determining whether the contact has sent the message.

In the computing device (121 and/or 111) of the aspect, the instructions, when executed by the at least one microprocessor (403), can be optionally configured to cause the computing device (121 and/or 111) to identify a trusted server that originates the message and verify that the sender identified by the trusted server has not been altered after the trusted server originates the message.

For example, a method associated with the computing device (121 and/or 111) of the aspect includes: storing a contact list of a user of the computing device (121 and/or 111), including a profile picture of the at least one contact identified in the contact list of the user; receiving a message identifying a sender of the message; determining that the sender identified by the message corresponds to the contact identified in the contact list of the user; determining (285) whether the contact has sent the message; and presenting the message on the computing device, where the message is presented (289) without the profile picture in response to the computing device failing to verify that the contact has sent the message, and presented (287) with the profile picture in response to successfully verifying that the contact has sent the message.

For example, the determining (285) of whether the contact has sent the message can optionally include: determining whether a header of the message includes a record of transmission by a server of a domain associated with an address of the sender of the message; determining whether the message is from a domain associated with an address of the sender of the message based on sender policy framework; checking whether a digital signature of the message corresponds to the contact; identifying a trusted server that originates the message and communicating with the trusted server to verify an origin of the message; or identifying a trusted server that originates the message and verifying that the sender identified by the trusted server has not been altered after the trusted server originates the message; or any combination thereof.

For example, when the message is an email message, the message identifies the sender can be identified in the message via a field in a header of the email message; and the method can optionally further include matching content of the field in the header of the email message to a corresponding field in the contact list in determining that the sender corresponds to the contact identified in the content list. For example, the field in the message can identify a name or an email address of the sender; and the field can be a "from" field or a "reply-to" field in a header of the email message. Some non-email based messaging applications, such as SMS messaging, MMS messaging, RCS messaging, or other apps that support social network messaging such as Snapchat or Facebook Messenger, can have similar identification of the sender of the message; and the same processing can take place to suppress the display of a contact's picture when the authenticity of the sender is in doubt.

The instructions configured for the computing device (121 and/or 111) of the aspect can be stored in a non-transitory computer storage medium (e.g., 409, 411, for loading into the computing device (121 and/or 111)). After the instructions are loaded into the computing device (121 and/or 111), the instructions executed in the computing device (121 and/or 111) causes the computing device (121 and/or 111) to perform the associated method discussed above.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing device, comprising:
at least one microprocessor;
a communication device configured to communicate over internet; and
memory configured to store instructions which, when executed by the at least one microprocessor, cause the computing device to:
maintain a contact list of a user of the computing device;
store, at least for one contact identified in the contact list, a profile picture of the contact identified in the contact list of the user;
receive a message, the message identifying a sender of the message;
determine that the sender identified by the message corresponds to the contact identified in the contact list of the user;
determine a risk score of at least one of the computing device or user, wherein the risk score is based at least partially on an assessed skill level of the user;
responsive to the risk score exceeding a threshold, determine whether the contact has sent the message; and
present the message on the computing device, wherein the message is presented without the profile picture in response to the computing device failing to verify that the contact has sent the message, and presented with the profile picture in response to successfully verifying that the contact has sent the message.

2. The computing device of claim 1, wherein the message is an email message; the message identifies the sender via a name in a from field of the email message; and the sender is determined to correspond to the contact based on the name matching with the contact in the contact list of the user.

3. The computing device of claim 1, wherein the message is an email message; the message identifies the sender via a name in a reply-to field of the email message; and the sender is determined to correspond to the contact based on the name matching with the contact in the contact list of the user.

4. The computing device of claim 1, wherein the message is an email message; the message identifies the sender via an email address in a from field or a reply-to field of the email message; and the sender is determined to correspond to the contact based on the email address matching with the contact in the contact list of the user.

5. The computing device of claim 1, wherein the instructions which, when executed by the at least one microprocessor, cause the computing device further to:
analyze a header of the message in determining whether the contact has sent the message.

6. The computing device of claim 5, wherein the instructions which, when executed by the at least one microprocessor, cause the computing device further to:
determine whether the header of the message includes a record of transmission by a server of a domain associated with an address of the sender of the message.

7. The computing device of claim 5, wherein the instructions which, when executed by the at least one microprocessor, cause the computing device further to:
determine whether the message is from a domain associated with an address of the sender of the message based on information provided via sender policy framework.

8. The computing device of claim 1, wherein the instructions which, when executed by the at least one microprocessor, cause the computing device further to:
verify whether the message has a digital signature of the contact in determining whether the contact has sent the message.

9. The computing device of claim 1, wherein the instructions which, when executed by the at least one microprocessor, cause the computing device further to:
identify a trusted server that originates the message; and
communicate with the trusted server to verify an origin of the message in determining whether the contact has sent the message.

10. The computing device of claim 1, wherein the instructions which, when executed by the at least one microprocessor, cause the computing device further to:
identify a trusted server that originates the message; and
verify that the sender identified by the trusted server has not been altered after the trusted server originates the message.

11. A method, comprising:
storing a contact list of a user of a computing device, including a profile picture of at least one contact identified in the contact list of the user;
receiving a message, the message identifying a sender of the message;
determining that the sender identified by the message corresponds to the contact identified in the contact list of the user;
determining a risk score of at least one of the computing device or user, including assessing a skill level of the user;
responsive to the risk score exceeding a threshold, determining whether the contact has sent the message; and
presenting the message on the computing device, wherein the message is presented without the profile picture in response to the computing device failing to verify that the contact has sent the message, and presented with the profile picture in response to successfully verifying that the contact has sent the message.

12. The method of claim 11, wherein the determining of whether the contact has sent the message includes:
determining whether a header of the message includes a record of transmission by a server of a domain associated with an address of the sender of the message.

13. The method of claim 11, wherein the determining of whether the contact has sent the message includes:
determining whether the message is from a domain associated with an address of the sender of the message based on sender policy framework.

14. The method of claim 11, wherein the determining of whether the contact has sent the message includes:
checking whether a digital signature of the message corresponds to the contact.

15. The method of claim 11, wherein the determining of whether the contact has sent the message includes:
identifying a trusted server that originates the message; and
communicating with the trusted server to verify an origin of the message.

16. The method of claim 11, wherein the determining of whether the contact has sent the message includes:
 identifying a trusted server that originates the message; and
 verifying that the sender identified by the trusted server has not been altered after the trusted server originates the message.

17. A non-transitory computer storage medium storing instructions of a security application of a computing device, the security application having instructions which when executed on the computing device, cause the computing device to perform a method, the method comprising:
 storing a contact list of a user of a computing device, including a profile picture of at least one contact identified in the contact list of the user;
 receiving a message, the message identifying a sender of the message;
 determining that the sender identified by the message corresponds to the contact identified in the contact list of the user;
 determining a risk score of at least one of the computing device or user, including assessing a skill level of the user;
 responsive to the risk score exceeding a threshold, determining whether the contact has sent the message; and
 presenting the message on the computing device, wherein the message is presented without the profile picture in response to the computing device failing to verify that the contact has sent the message, and presented with the profile picture in response to successfully verifying that the contact has sent the message.

18. The non-transitory computer storage medium of claim 17, wherein the message is an email message; the message identifies the sender via a field in a header of the email message; and the method further comprises:
 matching content of the field in the header of the email message to a corresponding field in the contact list in determining that the sender corresponds to the contact identified in the contact list.

19. The non-transitory computer storage medium of claim 18, wherein the field includes a name or an email address of the sender; and the field is a from field or a reply-to field in the header of the email message.

20. The non-transitory computer storage medium of claim 17, wherein the determining of whether the contact has sent the message includes:
 determining whether a header of the message includes a record of transmission by a server of a domain associated with an address of the sender of the message;
 determining whether the message is from a domain associated with an address of the sender of the message based on sender policy framework;
 checking whether a digital signature of the message corresponds to the contact;
 communicating with a trusted server to verify an origin of the message; or
 verifying that the sender identified by the trusted server has not been altered after the trusted server originates the message; or
 any combination thereof.

21. The computing device of claim 1, wherein the risk score is further based on a damage level potential of the computing device.

* * * * *